(12) United States Patent
Zhang et al.

(10) Patent No.: US 11,194,997 B1
(45) Date of Patent: Dec. 7, 2021

(54) METHOD AND SYSTEM FOR THERMAL INFRARED FACIAL RECOGNITION

(71) Applicant: NANJING HUATU INFORMATION TECHNOLOGY CO., LTD., Jiangsu (CN)

(72) Inventors: Tianxu Zhang, Hubei (CN); Xuan Su, Hubei (CN); Zhengtao Li, Hubei (CN); Shijia Guo, Hubei (CN); Ting Guo, Hubei (CN); Ya Peng, Hubei (CN)

(73) Assignee: NANJING HUATU INFORMATION TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/037,626

(22) Filed: Sep. 29, 2020

(30) Foreign Application Priority Data

Aug. 4, 2020 (CN) .......................... 202010773351.1

(51) Int. Cl.
*G06K 9/00* (2006.01)
*G06T 3/00* (2006.01)

(52) U.S. Cl.
CPC ..... *G06K 9/00255* (2013.01); *G06K 9/00281* (2013.01); *G06K 9/00288* (2013.01); *G06T 3/0006* (2013.01)

(58) Field of Classification Search
CPC .......... G06K 9/00255; G06K 9/00281; G06K 9/00288; G06T 3/0006
See application file for complete search history.

(56) References Cited

U.S. PATENT DOCUMENTS

| | | | | |
|---|---|---|---|---|
| 6,246,779 B1* | 6/2001 | Fukui | ................ | G06K 9/00268 382/100 |
| 7,027,621 B1* | 4/2006 | Prokoski | ............ | G06K 9/00248 180/272 |
| 7,602,942 B2* | 10/2009 | Bazakos | ............ | G06K 9/00255 209/577 |
| 9,906,738 B2* | 2/2018 | Zhang | ................ | G02B 17/0808 |
| 10,685,215 B2* | 6/2020 | Zhou | ................... | G06K 9/6256 |
| 2003/0053664 A1* | 3/2003 | Pavlidis | ............ | G06K 9/00228 382/117 |
| 2010/0172567 A1* | 7/2010 | Prokoski | ................ | A61B 5/418 382/132 |
| 2019/0162439 A1* | 5/2019 | Tsuda | ................. | G06K 9/00268 |
| 2021/0064851 A1* | 3/2021 | Zhang | ................. | G06K 9/4647 |
| 2021/0113093 A1* | 4/2021 | Nozawa | ................ | A61B 5/015 |

* cited by examiner

*Primary Examiner* — Md K Talukder
(74) *Attorney, Agent, or Firm* — JCIP Global Inc.

(57) ABSTRACT

A method and a system for thermal infrared facial recognition are provided. The method includes: determining a thermal infrared facial image to be recognized; inputting the thermal infrared facial image to be recognized into a trained three-sense component extractor to position eyes, a nose, and a mouth of a face in the image, and to perform regional positioning of a left eye, a right eye, the nose, and the mouth, so as to constitute a corresponding key region group; performing affine transformation on the thermal infrared facial image to be recognized using a difference between a key region group of a standard face and the key region group of the face to be recognized; inputting a thermal infrared image after face alignment calibration into a trained facial feature extraction to extract corresponding facial features; and inputting the extracted facial features into a trained classifier to recognize information of an owner.

16 Claims, 8 Drawing Sheets

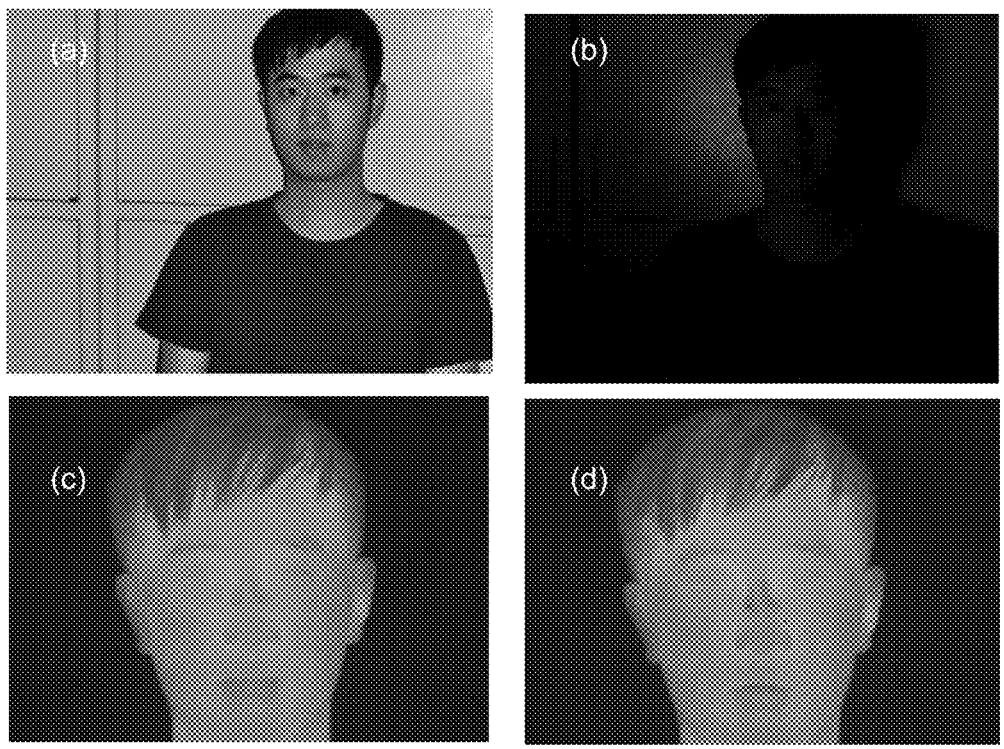

FIG. 1

```
┌─────────────────────────────────────────────────────────────────┐
│   Determine a thermal infrared facial image to be recognized    │─ S110
└─────────────────────────────────────────────────────────────────┘
                                 ▼
┌─────────────────────────────────────────────────────────────────┐
│ Input the thermal infrared facial image to be recognized into a trained three-sense component │
│ extractor to position eyes, a nose, and a mouth of a face in the image, and to perform regional │
│ positioning of a left eye, a right eye, the nose, and the mouth, so as to constitute a corresponding key │─ S120
│ region group.  The key region group further includes centroid coordinates of a mouth region, │
│ centroid coordinates of a left eye region, and centroid coordinates of a right eye region │
└─────────────────────────────────────────────────────────────────┘
                                 ▼
┌─────────────────────────────────────────────────────────────────┐
│ Perform affine transformation on the thermal infrared facial image to be recognized using a │
│ difference between a key region group of a standard face and the key region group of the face to be │─ S130
│ recognized, so as to obtain a thermal infrared image after face alignment calibration │
└─────────────────────────────────────────────────────────────────┘
                                 ▼
┌─────────────────────────────────────────────────────────────────┐
│ Input the thermal infrared image after face alignment calibration into a trained │─ S140
│        facial feature extraction to extract corresponding facial features        │
└─────────────────────────────────────────────────────────────────┘
                                 ▼
┌─────────────────────────────────────────────────────────────────┐
│ Input the extracted facial features into a trained classifier to recognize │─ S150
│                      information of an owner                      │
└─────────────────────────────────────────────────────────────────┘
```

METHOD AND SYSTEM FOR THERMAL INFRARED FACIAL RECOGNITION

CROSS-REFERENCE TO RELATED APPLICATION

This application claims the priority benefit of China application serial no. 202010773351.1, filed on Aug. 4, 2020. The entirety of the above-mentioned patent application is hereby incorporated by reference herein and made a part of this specification.

BACKGROUND

Technical Field

The disclosure relates to the intersecting fields of biological feature recognition and infrared technology, and more specifically relates to a method and a system for thermal infrared facial recognition.

Description of Related Art

Through facial recognition, that is, for a thermal infrared facial image, the label or name of the corresponding face may be known. Visible light facial recognition has been widely applied to fields such as customs, stations, attendance, autonomous driving, and suspect tracking. However, the visible light facial recognition technology cannot work without an external light source, such as at night when there is no external light source. As a result, the tracking of suspects at night cannot be performed. If there is no external light source, visible light facial recognition at the gates of a community also cannot be performed. Images (a) and (b) in FIG. 1 are respectively visible light images with and without illumination. Images (c) and (d) in FIG. 1 are respectively thermal infrared images with and without illumination. The presence or absence of illumination causes fundamental difficulties in visible light recognition without affecting the thermal infrared images. Visible light facial recognition also cannot recognize fake faces with disguise. Also, visible light recognition cannot perform live detection and cannot determine whether the image is a real person. Therefore, it is easy to be deceived by photos and faces with makeup, which causes facial recognition to fail and has many limiting factors.

Since a visible light image has three channels with rich information and the image is clearer, it is easier to position the key points. However, a thermal infrared facial image is formed by the thermal radiation of a living head, the image is a single-channel gray image, and has poorer definition as compared with the visible light image. For example, the outlines of the eyes, nose, and mouth are not obvious. Therefore, thermal infrared facial recognition cannot be implemented by adopting the form of direct marking of landmark.

At present, near-infrared facial recognition is beginning to emerge, but the technology requires an active light source and the distance is limited to 50 cm to 100 cm. In addition, the active light source will produce obvious reflections on glasses, which reduces the accuracy of eye positioning. Also, the active light source will be damaged and attenuated after long-term usage.

Due to the particularity of the thermal infrared facial image, the method for visible light facial recognition cannot be applied to thermal infrared facial recognition.

SUMMARY

The disclosure provides a method and a system for facial recognition of a thermal infrared image, which aims to solve the technical issues that existing visible light facial recognition cannot be performed without an external light source, the active near-infrared facial recognition technology is limited by the distance, a thermal infrared facial image is a single-channel grayscale image with poorer definition, and thermal infrared facial recognition cannot be implemented by adopting the form of direct punctuation.

In order to achieve the above objectives, in the first aspect, the disclosure provides a method for thermal infrared facial recognition, which includes the following steps.

A thermal infrared facial image to be recognized is determined.

The thermal infrared facial image to be recognized is input into a trained three-sense component extractor to position eyes, a nose, and a mouth of a face in the image, and to perform regional positioning of a left eye, a right eye, the nose, and the mouth, so as to constitute a corresponding key region group. The key region group further includes centroid coordinates of a mouth region, centroid coordinates of a left eye region, and centroid coordinates of a right eye region.

A difference between a key region group of a standard face and the key region group of the face to be recognized is used to perform affine transformation on the thermal infrared facial image to be recognized, so as to obtain a thermal infrared image after face alignment calibration.

The thermal infrared image after face alignment calibration is input into a trained facial feature extraction to extract corresponding facial features.

The extracted facial features are input into a trained classifier to recognize information of an owner.

In an embodiment, the trained three-sense component extractor adopts following equations to position the eye, nose, and mouth regions on the thermal infrared facial image:

$$\text{Area}_{Nose}=\{C(x,y)=[RGB_{Nose}]|0\le x\le W, 0\le y\le H\}$$

$$\text{Area}_{Mouth}=\{C(x,y)=[RGB_{Mouth}]|0\le x\le W, 0\le y\le H\}$$

$$\text{Area}_{Eyes}=\{C(x,y)=[RGB_{Eyes}]|0\le x\le W, 0\le y\le H\}$$

where, $\text{Area}_{Nose}$ represents the nose region, $\text{Area}_{Mouth}$ represents the mouth region, and $\text{Area}_{Eyes}$ represents the eye region, which includes a left eye region and a right eye region; x and y respectively represent a width coordinate and a height coordinate of each pixel in the thermal infrared facial image under an image plane rectangular coordinate system, and C(x, y) represents a channel value at coordinates (x, y) in the thermal infrared facial image after the thermal infrared image is converted into three channels; W is a width of the thermal infrared image, H is a height of the thermal infrared image, R, G, and B respectively represent a red channel value, a green channel value, and a blue channel value, and $RGB_{Nose}$, $RGB_{Mouth}$, and $RGB_{Eyes}$ respectively represent color values of the nose, the mouth, and the eyes.

In an embodiment, a centroid of the nose region is:

$$\begin{cases} \overline{X_{Nose}} = \dfrac{1}{\text{Nose}_{total}}\sum_j x_j, \forall\,(x_j, y_j) \in \text{Area}_{Nose} \\ \overline{Y_{Nose}} = \dfrac{1}{\text{Nose}_{total}}\sum_j y_j, \forall\,(x_j, y_j) \in \text{Area}_{Nose} \end{cases}$$

where, $(\overline{X_{Nose}}, \overline{Y_{Nose}})$ represents centroid coordinates of the nose region; and $Nose_{total}$ represents a total number of pixels within the nose region, $x_j$ represents a width coordinate of a $j^{th}$ pixel in the nose region, and $y_j$ represents a height coordinate of the $j^{th}$ pixel in the nose region.

A centroid of the mouth region is:

$$\begin{cases} \overline{X_{Mouth}} = \dfrac{1}{Mouth_{total}} \sum_k x_k, \forall\, (x_k, y_k) \in Area_{Mouth} \\ \overline{Y_{Mouth}} = \dfrac{1}{Mouth_{total}} \sum_k y_k, \forall\, (x_k, y_k) \in Area_{Mouth} \end{cases}$$

where, $(\overline{X_{Mouth}}, \overline{Y_{Mouth}})$ represents centroid coordinates of the mouth region; and $Mouth_{total}$ represents a total number of pixels within the mouth region, $x_k$ represents a width coordinate of a $k^{th}$ pixel in the mouth region, and $y_k$ represents a height coordinate of the $k^{th}$ pixel in the mouth region.

In an embodiment, the eye region is divided into the left eye region and the right eye region by adopting a connecting line of the centroid of the mouth region and the centroid of the nose region, and the specific division is as follows:

$Area_{Leye} =$ $$\left\{ C(u, v) = [RGB_{Eyes}] \;\middle|\; 0 \le u \le \dfrac{(\overline{X_{Mouth}} - \overline{X_{Nose}}) * (v - \overline{Y_{nose}})}{\overline{Y_{Mouth}} - \overline{Y_{nose}}} + \overline{X_{nose}}, \right.$$

$$\left. 0 \le v \le H \right\}$$

$$Area_{Reye} = \left\{ C(u, v) = [RGB_{Eyes}] \;\middle|\; \right.$$

$$\left. \dfrac{(\overline{X_{Mouth}} - \overline{X_{Nose}}) * (v - \overline{Y_{nose}})}{\overline{Y_{Mouth}} - \overline{X_{nose}}} + \overline{Y_{nose}} \le u \le W, 0 \le v \le H \right\}$$

where, $Area_{Leye}$ represents the left eye region, and $Area_{Reye}$ represents the right eye region.

Centroid coordinates of the left eye region and centroid coordinates of the right eye region are respectively:

$$\begin{cases} \overline{X_{Leye}} = \dfrac{1}{Leye_{total}} \sum_l x_l, \forall\, (x_l, y_l) \in Area_{Leye} \\ \overline{Y_{Leye}} = \dfrac{1}{Leye_{total}} \sum_l y_l, \forall\, (x_l, y_l) \in Area_{Leye} \end{cases}$$

$$\begin{cases} \overline{X_{Reye}} = \dfrac{1}{Reye_{total}} \sum_r x_r, \forall\, (x_r, y_r) \in Area_{Reye} \\ \overline{Y_{Reye}} = \dfrac{1}{Reye_{total}} \sum_r y_r, \forall\, (x_r, y_r) \in Area_{Reye} \end{cases}$$

where, $(\overline{X_{Leye}}, \overline{Y_{Leye}})$ is the centroid coordinates of the left eye region, $\overline{X_{Leye}}$ and $\overline{Y_{Leye}}$ are respectively a width value and a height value of the left eye region, $Leye_{total}$ represents a sum of pixels in the left eye region, $xl$ represents a width coordinate of an $l^{th}$ pixel in the left eye region, and $y_l$ represents a height coordinate of the $l^{th}$ pixel in the left eye region; and $(\overline{X_{Reye}}, \overline{Y_{Reye}})$ is the centroid coordinates of the right eye region, $\overline{X_{Reye}}$ and $\overline{Y_{Reye}}$ are respectively a width value and a height value of the right eye region, $Reye_{total}$ represents a sum of pixels in the right eye region, $x_r$ represents a width coordinate of a $r^{th}$ pixel in the right eye region, and $y_r$ represents a height coordinate of the $r^{th}$ pixel in the right eye region.

In an embodiment, the method for facial recognition further includes the following steps.

A thermal infrared image of a standard face is obtained through superposing and averaging pixels of multiple thermal infrared frontal facial images of multiple people. The connecting line of the centroid of the left eye region and the centroid of the right eye region of the standard face is parallel to the X-axis of the image plane rectangular coordinate system, and the connecting line of the centroid of the nose region and the centroid of the mouth region of the standard face is parallel to the Y-axis of the image plane rectangular coordinate system.

The thermal infrared image of the standard face is input into the trained three-sense component extractor to obtain the key region group of the standard face, which includes the centroid coordinates of the mouth region, the centroid coordinates of the left eye region, and the centroid coordinates of the right eye region.

According to the difference between the key region group of the standard face and the key region group of the face to be recognized, affine transformation is performed on the thermal infrared facial image to be recognized, which specifically includes the following steps.

Coordinates of the key region group of the standard face is determined:

$$\overline{X}_{std,p} = \dfrac{1}{Q} \sum_{s=1}^{Q} \overline{X}_{s,p},\; p \in (\text{Mouth, Leye, Reye})$$

$$\overline{Y}_{std,p} = \dfrac{1}{Q} \sum_{s=1}^{Q} \overline{Y}_{s,p},\; p \in (\text{Mouth, Leye, Reye})$$

where, $\overline{X}_{std,p}$ and $\overline{Y}_{std,p}$ are respectively a width coordinate and a height coordinate of a centroid in a p region of the standard face, p regions are respectively a mouth Mouth region, a left eye Leye region, and a right eye Reye region, $\overline{X}_{s,p}$ represents a width coordinate of the centroid in the p region of an $s^{th}$ frontal facial thermal infrared image, $\overline{Y}_{s,p}$ represents a height coordinate of the centroid in the p region of the $s^{th}$ thermal infrared frontal facial image, and Q represents a total number of thermal infrared frontal facial images.

An affine transformation matrix is determined through the following formula:

$$\begin{bmatrix} \overline{X}_{std,p} \\ \overline{Y}_{std,p} \\ 1 \end{bmatrix} = \begin{bmatrix} a & b & c \\ d & e & f \\ 0 & 0 & 1 \end{bmatrix} \begin{bmatrix} x_p \\ y_p \\ 1 \end{bmatrix}$$

where, $(x_p, y_p)$ is respectively a width coordinate and a height coordinate of a centroid in a p region of the thermal infrared facial image to be recognized before face alignment, $$\begin{bmatrix} a & b & c \\ d & e & f \\ 0 & 0 & 1 \end{bmatrix}$$

is the affine transformation matrix, and a, b, c, d, e, and f are all parameters in the affine transformation matrix.

Affine transformation is performed on the thermal infrared facial image to be recognized using the obtained affine transformation matrix to obtain the thermal infrared image after face alignment calibration.

In an embodiment, a neural network for facial feature recognition is constructed to form a corresponding facial feature extraction. The facial feature extraction enables the degree of similarity of features of thermal infrared facial images of the same person to be high and the degree of similarity of features of thermal infrared facial images of different people to be low.

A loss function L of the facial feature extraction may adopt the two types below:

The first loss function is:

$$L = \|feature - HoC\|_2 - \|feature - HeC\|_2$$

where, feature is a feature of an input thermal infrared image extracted through the facial feature extraction, HoC is a category center feature of a category of the input thermal infrared image, and HeC is a category average feature of a certain category in which the input thermal infrared image is divided into. For a wrongly classified thermal infrared image, a distance between the feature extracted from the thermal infrared image and a category center thereof is decreased while a distance between the feature and a wrongly classified category center is increased.

The second loss function is:

$$L = \|feature - HoC\|_2$$

where, feature is the feature of the input thermal infrared image extracted by the facial feature extraction, and HoC is a feature vector of a category center of the input thermal infrared image. For the wrongly classified thermal infrared image, only the distance between the feature extracted from the thermal infrared image and the category center thereof is decreased.

In the second aspect, the disclosure provides a system for facial recognition of a thermal infrared image, which includes the following.

An image determination unit is configured to determine a thermal infrared facial image to be recognized.

A region group construction unit is configured to input the thermal infrared facial image to be recognized into a trained three-sense component extractor to position eyes, a nose, and a mouth of a face in the image, and to perform regional positioning of a left eye, a right eye, the nose, and the mouth, so as to constitute a corresponding key region group. The key region group further includes centroid coordinates of a mouth region, centroid coordinates of a left eye region, and centroid coordinates of a right eye region.

An image alignment unit is configured to perform affine transformation on the thermal infrared facial image to be recognized according to a difference between a key region group of a standard face and the key region group of the face to be recognized, so as to obtain a thermal infrared image after face alignment calibration.

A feature extraction unit inputs the thermal infrared image after face alignment calibration into a trained facial feature extraction to extract corresponding facial features.

An image recognition unit is configured to input the extracted facial features into a trained classifier to recognize information of an owner.

In an embodiment, the region group construction unit adopts the following equations to position the eye, nose, and mouth regions on the thermal infrared facial image:

$$Area_{Nose} = \{C(x,y) = [RGB_{Nose}] | 0 \leq x \leq W, 0 \leq y \leq H\}$$

$$Area_{Mouth} = \{C(x,y) = [RGB_{Mouth}] | 0 \leq x \leq W, 0 \leq y \leq H\}$$

$$Area_{Eyes} = \{C(x,y) = [RGB_{Eyes}] | 0 \leq x \leq W, 0 \leq y \leq H\}$$

where, $Area_{Nose}$ represents the nose region, $Area_{Mouth}$ represents the mouth region, and $Area_{Eyes}$ represents the eye region, which includes a left eye region and a right eye region; x and y respectively represent a width coordinate and a height coordinate of each pixel in the thermal infrared facial image under an image plane rectangular coordinate system, and C(x, y) represents a channel value at coordinates (x, y) in the thermal infrared facial image after the thermal infrared image is converted into three channels; W is a width of the thermal infrared image, H is a height of the thermal infrared image, R, G, and B respectively represent a red channel value, a green channel value, and a blue channel value, and $RGB_{Nose}$, $RGB_{Mouth}$, and $RGB_{Eyes}$ respectively represent color values of the nose, the mouth, and the eyes.

In an embodiment, the system for facial recognition further includes the following.

A standard face determination unit is configured to obtain a standard thermal infrared facial image through superposing and averaging pixels of multiple thermal infrared frontal facial images of multiple people. A connecting line of a centroid of a left eye region and a centroid of a right eye region of a standard face is parallel to the X-axis of the image plane rectangular coordinate system, and a connecting line of a centroid of a nose region and a centroid of a mouth region of the standard face is parallel to the Y-axis of the image plane rectangular coordinate system.

The region group construction unit is further configured to input a thermal infrared image of the standard face into the trained three-sense component extractor to obtain a key region group of the standard face, which includes centroid coordinates of the mouth region, centroid coordinates of the left eye region, and centroid coordinates of the right eye region.

The image alignment unit is configured to determine coordinates of the key region group of the standard face through the following formulae:

$$\overline{X}_{std,p} = \frac{1}{Q}\sum_{s=1}^{Q} X_{s,p},\ p \in (\text{Mouth}, \text{Leye}, \text{Reye});$$

$$\overline{Y}_{std,p} = \frac{1}{Q}\sum_{s=1}^{Q} Y_{s,p},\ p \in (\text{Mouth}, \text{Leye}, \text{Reye});$$

where, $\overline{X}_{std,p}$ and $\overline{Y}_{std,p}$ are respectively a width coordinate and a height coordinate of a centroid in a p region of the standard face, p regions are respectively a mouth Mouth region, a left eye Leye region, and a right eye Reye region, $\overline{X}_{std,p}$ represents a width coordinate of the centroid in the p region of an $s^{th}$ frontal facial thermal infrared image, $\overline{Y}_{std,p}$ represents a height coordinate of the centroid in the p region of the $s^{th}$ thermal infrared frontal facial image, and Q represents a total number of thermal infrared frontal facial images; determine an affine transformation matrix through the following formula:

$$\begin{bmatrix} X_{std,p} \\ Y_{std,p} \\ 1 \end{bmatrix} = \begin{bmatrix} a & b & c \\ d & e & f \\ 0 & 0 & 1 \end{bmatrix} \begin{bmatrix} x_p \\ y_p \\ 1 \end{bmatrix};$$

where, $(x_p, y_p)$ is respectively a width coordinate and a height coordinate of a centroid in a p region of the thermal infrared facial image to be recognized before face alignment, $$\begin{bmatrix} a & b & c \\ d & e & f \\ 0 & 0 & 1 \end{bmatrix}$$

is the affine transformation matrix, and a, b, c, d, e, and f are all parameters in the affine transformation matrix; and perform affine transformation on the thermal infrared facial image to be recognized according to the obtained affine transformation matrix to obtain the thermal infrared image after face alignment calibration.

In an embodiment, the feature extraction unit is configured to construct a neural network for facial feature recognition to form a corresponding facial feature extraction. The facial feature extraction enables the degree of similarity of features of thermal infrared facial images of the same person to be high and the degree of similarity of features of thermal infrared facial images of different people to be low. A loss function L of the facial feature extraction may adopt the two types below: the first loss function is: $L=\|feature-HoC\|_2 - \|feature-HeC\|_2$; where, feature is a feature of an input thermal infrared image extracted through the facial feature extraction, HoC is a category centre feature of a category of the input thermal infrared image, and HeC is a category average feature of a certain category in which the input thermal infrared image is divided into. For a wrongly classified thermal infrared image, a distance between the feature extracted from the thermal infrared image and a category center thereof is decreased while a distance between the feature and a wrongly classified category center is increased; and the second loss function is: $L=\|feature-HoC\|_2$; where, feature is the feature of the input thermal infrared image extracted by the facial feature extraction, and HoC is a feature vector of a category center of the input thermal infrared image. For the wrongly classified thermal infrared image, only the distance between the feature extracted from the thermal infrared image and the category center thereof is decreased.

In general, compared with the prior art, the above technical solutions conceived by the disclosure can achieve the following beneficial effects.

The disclosure provides a method and a system for thermal infrared facial recognition, which can accurately obtain a thermal infrared facial image from an original thermal infrared image. The disclosure adopts a key point positioning technology which is completely different from visible light facial recognition, and extracts the feature region of the thermal infrared facial image by adopting the form of regional positioning. Then, face alignment is performed on the extracted key point group. The alignment effect is very good.

The disclosure provides a method and a system for thermal infrared facial recognition. The loss function of the feature extraction adopts the method of decreasing the distance between the image features of the same person and increasing the distance between the image features of different people. Adopting such loss function is more effective than the method of only increasing the distance between the image features of different people or only decreasing the distance between the image features of the same person. The recognition rate and the classification accuracy can be improved.

The disclosure provides a method and a system for thermal infrared facial recognition. Facial recognition through the thermal infrared technology can recognize the thermal infrared facial image without any light source to meet the recognition requirements for the thermal infrared image.

The disclosure provides a method and a system for thermal infrared facial recognition. The thermal infrared facial recognition technology can recognize faces with disguise and can distinguish photos well to achieve the effect of biological feature recognition.

BRIEF DESCRIPTION OF THE DRAWINGS

FIG. 1 is a comparison diagram of visible light images and thermal infrared images with or without illumination.

FIG. 2 is a flowchart of a method for thermal infrared facial recognition according to the disclosure.

DETAILED DESCRIPTION OF DISCLOSED EMBODIMENTS

Figure 3:
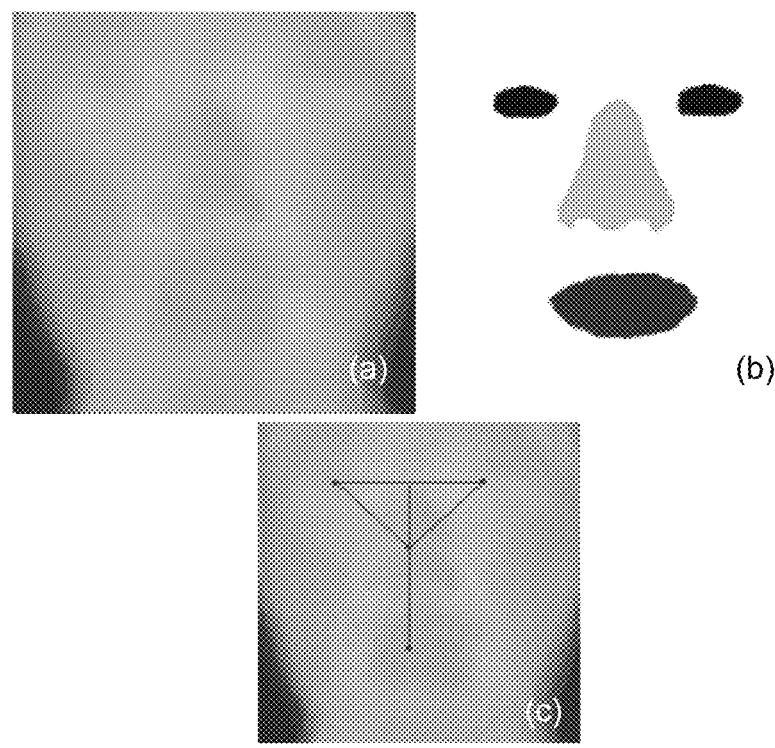
FIG. 3 is a schematic diagram of three-sense organ positioning and a standard face according to the disclosure.

In order to make the objectives, technical solutions, and advantages of the disclosure clearer, the disclosure is further described in detail below with reference to the accompanying drawings and embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

In response to the urgent demand for thermal infrared facial recognition technology, the disclosure provides a method for facial recognition of a thermal infrared image, which can reliably recognize the label or name of the face in the thermal image without any light source.

To achieve the above objective, the disclosure provides a method for facial recognition of a thermal infrared image, which includes the following steps.

Step (1) of searching a head image in a field of view through controlling a zoomable thermal infrared camera to be sent into a processor for data processing.

Step (2) of inputting a thermal infrared image to detect a thermal infrared face.

Step (3) of sending a thermal infrared facial image to be recognized to a facial three-sense component extractor, which focuses on learning of features of eyes, nose, and mouth regions to automatically obtain a three-sense positioning image of eyes, a nose, and a mouth, and performing regional positioning to constitute a key region group {left eye, right eye, nose, mouth}.

Step (4) of calculating a required affine/similarity transformation matrix using the key region group of the thermal infrared facial image to be recognized and a key region group of a standard face, performing affine transformation on the thermal infrared facial image to be recognized, and outputting a thermal infrared facial image after alignment.

Step (5) of sending the aligned thermal infrared facial image to a feature extraction for facial recognition. The feature extraction may automatically extract facial features. The facial feature extraction enables the degree of similarity of features of thermal infrared facial images of the same person to be high and the degree of similarity of features of thermal infrared facial images of different people to be low.

Step (6) of outputting a name or a label of a judged person by a classifier according to the features.

Preferably, in Step (2), N thermal infrared images are used as positive samples and L thermal infrared images without faces are used as negative samples to form a training set. M thermal infrared images are obtained as a test set. A head box and a face box of each thermal infrared image in the positive samples are respectively boxed as ground truth boxes. A mark of each thermal infrared image in the positive samples is 1 and a mark of each thermal infrared image in the negative samples is 0. Center point coordinates and width and height dimensions of the ground truth boxes of each thermal infrared image are scaled down. The scaled down center point coordinates and width and height dimensions are stored in an independent txt file with the mark of the thermal infrared image. A total of N txt files is obtained.

In addition, a path of each thermal infrared image in the training set and marks of all thermal infrared images in the negative sample are stored together in another txt file. As such, a total of N+1 txt files is obtained as training labels.

A convolutional neural network is built. The training set and the training labels are input together into the convolutional neural network for training. The convolutional neural network is optimized using a loss function, thereby obtaining a required training model of the convolutional neural network. The thermal infrared images in the test set are inputted. Head and face detection boxes are obtained through the convolutional neural network.

The convolutional neural network adopts the Darknet backbone and the Yolo network. The Darknet backbone is configured to perform convolution, maximum pooling, and normalization operations on the input thermal infrared images to obtain weights of the convolutional neural network. The Yolo network is configured to process the weights of the convolutional neural network to perform face judgement and position regression.

Preferably, the dimensional relationship between the ground truth box and a prediction box constructed by the convolutional neural network is as follows:

$$a_x = d_x + \Delta(m_x)$$

$$a_y = d_y + \Delta(m_y)$$

$$a_w = p_w e^{m_w}$$

$$a_h = p_h e^{m_h}$$

where, $a_x$ and $a_y$ respectively represent a width and a height of center coordinates of the ground truth box under an image plane rectangular coordinate system, $a_w$ and $a_h$ represent a width and a height of the ground truth box, $\Delta(m_x)$ and $\Delta(m_y)$ respectively represent a width direction offset and a height direction offset from a center of the ground truth box to a center of the prediction box, $d_x$ and $d_y$ respectively represent a width and a height of center coordinates of the prediction box, $p_w$ and $p_h$ respectively represent a width and a height of the prediction box, $m_w$ and $m_h$ are respectively a width scaling ratio and a height scaling ratio of the prediction box, and $\Delta$ function is a sigmoid function.

Preferably, there are six prediction boxes constructed by the convolutional neural network which are divided into two scales. Heights of the six prediction boxes are sorted from large to small and are respectively prediction box 1 to prediction box 6. A first scale is allocated to the prediction box 1, the prediction box 3, and the prediction box 5. A second scale is allocated to the prediction box 2, the prediction box 4, and the prediction box 6.

The convolutional neural network is optimized by the loss function, specifically as follows:

$$\text{loss} = \lambda_{coord} \sum_{i=0}^{S^2} \sum_{j=0}^{Z} 1_{ij}^{obj} [(x_i - \hat{x}_i)^2 + (y_i - \hat{y}_i)^2]$$

$$+ \lambda_{coord} \sum_{i=0}^{S^2} \sum_{j=0}^{Z} 1_{ij}^{obj} \left[ \left(\sqrt{w_i} - \sqrt{\hat{w}_i}\right)^2 + \left(\sqrt{h_i} - \sqrt{\hat{h}_i}\right)^2 \right]$$

$$+ \sum_{i=0}^{S^2} \sum_{j=0}^{Z} 1_{ij}^{obj} [\hat{c}_i \log(c_i) + (1 - \hat{c}_i)\log(1 - c_i)]$$

$$+ \lambda_{noobj} \sum_{i=0}^{S^2} \sum_{j=0}^{Z} 1_{ij}^{noobj} [\hat{c}_i \log(c_i) + (1 - \hat{c}_i)\log(1 - c_i)]$$

$$+ \sum_{i=0}^{S^2} \sum_{c \in classes} (p_i(c) - \hat{p}_i(c))^2$$

where, loss represents loss, $S^2$ represents a number of grids of the convolutional neural network, Z represents a number of prediction boxes per unit grid, $1_{ij}^{obj}$ represents whether a $j^{th}$ anchor box of an $i^{th}$ grid is responsible for a target, and a value of 0 is taken when not responsible and a value of 1 is taken when responsible, $1_{ij}^{noobj}$ represents that the $j^{th}$ prediction box of the $i^{th}$ grid is not responsible for the target, a value of 1 is taken when there is a target and a value of 0 is taken when there is no target, $\lambda_{coor}=5$, $\lambda_{noobj}=0.5$, xi and yi respectively represent a width and a height of center point coordinates of an $i^{th}$ prediction box, $\hat{x}_i$ and $\hat{y}_i$ respectively represent a width and a height of center point coordinates of an $i^{th}$ ground truth box, $w_i$ and $h_i$ respectively represent a width and a height of the $i^{th}$ prediction box, $\hat{w}_i$ and $\hat{h}_i$ respectively represent a width and a height of the $i^{th}$ ground truth box, $c_i$ represents a confidence level of the $i^{th}$ prediction box, and a value of a selected prediction box is taken as 1 and a value of an unselected prediction box is taken as 0, $\hat{c}_i$ represents a confidence level of the $i^{th}$ ground truth box, and a value of a selected ground truth box is taken as 1 and a value of an unselected ground truth box is taken as 0, $p_i$ represents a classification probability that there is a face in the $i^{th}$ prediction box, $\hat{p}_i$ represents a classification probability that there is a face in the $i^{th}$ ground truth box, c represents a class without face, and classes represents a collection of classes with and without faces.

After the loss is obtained, the stochastic gradient descent algorithm is adopted to update the convolutional neural network to continuously select and judge optimal parameters under a current target. According to the result of the loss, the parameters in the convolutional neural network are updated. The convolutional neural network stops updating after reaching a required quota.

FIG. 2 is a flowchart of a method for thermal infrared facial recognition according to the disclosure. As shown in FIG. 2, the method includes the following steps.

Step S110 of determining a thermal infrared facial image to be recognized.

Step S120 of inputting the thermal infrared facial image to be recognized into a trained three-sense component extractor to position eyes, a nose, and a mouth of a face in the image, and to perform regional positioning of a left eye, a right eye, the nose, and the mouth, so as to constitute a corresponding key region group. The key region group further includes centroid coordinates of a mouth region, centroid coordinates of a left eye region, and centroid coordinates of a right eye region.

Step S130 of performing affine transformation on the thermal infrared facial image to be recognized using a difference between a key region group of a standard face and the key region group of the face to be recognized, so as to obtain a thermal infrared image after face alignment calibration.

Step S140 of inputting the thermal infrared image after face alignment calibration into a trained facial feature extraction to extract corresponding facial features.

Step S150 of inputting the extracted facial features into a trained classifier to recognize information of an owner.

In an embodiment, the trained three-sense component extractor adopts following equations to position the eye, nose, and mouth regions of the face:

$$Area_{Nose} = \{C(x,y) = [RGB_{Nose}] | 0 \le x \le W, 0 \le y \le H\}$$

$$Area_{Mouth} = \{C(x,y) = [RGB_{Mouth}] | 0 \le x \le W, 0 \le y \le H\}$$

$$Area_{Eyes} = \{C(x,y) = [RGB_{Eyes}] | 0 \le x \le W, 0 \le y \le H\}$$

where, $Area_{Nose}$ represents the nose region, $Area_{Mouth}$ represents the mouth region, and $Area_{Eyes}$ represents the eye region, which includes a left eye region and a right eye region; x and y respectively represent a width coordinate and a height coordinate of each pixel in the thermal infrared facial image under an image plane rectangular coordinate system, and C(x, y) represents a channel value at coordinates (x, y) in the thermal infrared facial image after being converted into three channels; W is a width of the thermal infrared image, H is a height of the thermal infrared image, R, G, and B respectively represent a red channel value, a green channel value, and a blue channel value, and $RGB_{Nose}$, $RGB_{Mouth}$, and $RGB_{Eyes}$ respectively represent color values of the nose, the mouth, and the eyes.

Specifically, as shown in FIG. 3, Image (a) is a thermal infrared facial image and Image (b) shows different colors the eyes, the nose and the mouth after the thermal infrared face image is converted into three channels (since patent drawings cannot show color drawings, specific colors cannot be indicated). In FIG. 3, Image (c) is a schematic diagram of a standard face. As shown in Image (c), a connecting line of a centroid of the left eye region and a centroid of the right eye region of the standard face is parallel to the X-axis of the image plane rectangular coordinate system, and a connecting line of a centroid of the nose region and a centroid of the mouth region of the standard face is parallel to the Y-axis of the image plane rectangular coordinate system.

In an embodiment, the centroid of the nose region is:

$$\begin{cases} \overline{X_{Nose}} = \frac{1}{Nose_{total}} \sum_j x_j, \forall (x_j, y_j) \in Area_{Nose} \\ \overline{Y_{Nose}} = \frac{1}{Nose_{total}} \sum_j y_j, \forall (x_j, y_j) \in Area_{Nose} \end{cases}$$

where, $(\overline{X_{Nose}}, \overline{Y_{nose}})$ represents centroid coordinates of the nose region; and $Nose_{total}$ represents a total number of pixels within the nose region, $x_j$ represents a width coordinate of a $j^{th}$ pixel in the nose region, and $y_j$ represents a height coordinate of the $j^{th}$ pixel in the nose region.

The centroid of the mouth region is:

$$\begin{cases} \overline{X_{Mouth}} = \frac{1}{Mouth_{total}} \sum_k x_k, \forall (x_k, y_k) \in Area_{Mouth} \\ \overline{Y_{Mouth}} = \frac{1}{Mouth_{total}} \sum_k y_k, \forall (x_k, y_k) \in Area_{Mouth} \end{cases}$$

where, $(\overline{X_{Mouth}}, \overline{Y_{Mouth}})$ represents centroid coordinates of the mouth region; and $Mouth_{total}$ represents a total number of pixels within the mouth region, $x_k$ represents a width coordinate of a $k^{th}$ pixel in the mouth region, and $y_k$ represents a height coordinate of the $k^{th}$ pixel in the mouth region.

In an embodiment, the eye region is divided into the left eye region and the right eye region by adopting the connecting line of the centroid of the mouth region and the centroid of the nose region, and the specific division is as follows:

$$Area_{Leye} = \left\{ C(u,v) = [RGB_{Eyes}] \,\middle|\, 0 \le u \le \frac{(\overline{X_{Mouth}} - \overline{X_{Nose}}) * (v - \overline{Y_{nose}})}{\overline{Y_{Mouth}} - \overline{Y_{nose}}} + \overline{X_{nose}}, 0 \le v \le H \right\}$$

$$Area_{Reye} = \left\{ C(u,v) = [RGB_{Eyes}] \,\middle|\, \frac{(\overline{X_{Mouth}} - \overline{X_{Nose}}) * (v - \overline{Y_{nose}})}{\overline{Y_{Mout}} - \overline{Y_{nose}}} + \overline{X_{nose}} \le v \le W, 0 \le v \le H \right\}$$

where, $Area_{Leye}$ represents the left eye region, and $Area_{Reye}$ represents the right eye region.

Centroid coordinates of the left eye region and centroid coordinates of the right eye region are respectively:

$$\begin{cases} \overline{X_{Leye}} = \frac{1}{Leye_{total}} \sum_l x_l, \forall (x_l, y_l) \in Area_{Leye} \\ \overline{Y_{Leye}} = \frac{1}{Leye_{total}} \sum_l y_l, \forall (x_l, y_l) \in Area_{Leye} \end{cases}$$

-continued $$\begin{cases} \overline{X_{Reye}} = \frac{1}{Reye_{total}} \sum_r x_r, \forall (x_r, y_r) \in Area_{Reye} \\ \overline{Y_{Reye}} = \frac{1}{Reye_{total}} \sum_r y_r, \forall (x_r, y_r) \in Area_{Reye} \end{cases}$$

where, $(\overline{X_{Leye}}, \overline{Y_{Leye}})$ is the centroid coordinates of the left eye region, $\overline{X_{Leye}}$ and $\overline{Y_{Leye}}$ are respectively a width value and a height value of the left eye region, $Leye_{total}$ represents a sum of pixels in the left eye region, xi represents a width coordinate of an $l^{th}$ pixel in the left eye region, and $y_l$ represents a height coordinate of the $l^{th}$ pixel in the left eye region; and $(\overline{X_{Reye}}, \overline{Y_{Reye}})$ is the centroid coordinates of the right eye region, $\overline{X_{Reye}}$ and $\overline{Y_{Reye}}$ are respectively a width value and a height value of the right eye region, $Reye_{total}$ represents a sum of pixels in the right eye region, $x_r$ represents a width coordinate of a $r^{th}$ pixel in the right eye region, and $y_r$ represents a height coordinate of the $r^{th}$ pixel in the right eye region.

In an embodiment, the method for facial recognition further includes the following steps.

A thermal infrared image of a standard face is obtained through superposing and averaging pixels of multiple thermal infrared frontal facial images of multiple people. The connecting line of the centroid of the left eye region and the centroid of the right eye region of the standard face is parallel to the X-axis of the image plane rectangular coordinate system, and the connecting line of the centroid of the nose region and the centroid of the mouth region of the standard face is parallel to the Y-axis of the image plane rectangular coordinate system.

The thermal infrared image of the standard face is input into the trained three-sense component extractor to obtain the key region group of the standard face, which includes the centroid coordinates of the mouth region, the centroid coordinates of the left eye region, and the centroid coordinates of the right eye region.

According to the difference between the key region group of the standard face and the key region group of the face to be recognized, affine transformation is performed on the thermal infrared facial image to be recognized, which specifically includes the following steps.

Coordinates of the key region group of the standard face is determined:

$$\overline{X}_{std,p} = \frac{1}{Q} \sum_{s=1}^{Q} X_{s,p}, p \in (Mouth, Leye, Reye)$$

$$\overline{Y}_{std,p} = \frac{1}{Q} \sum_{s=1}^{Q} Y_{s,p}, p \in (Mouth, Leye, Reye)$$

where, $\overline{X}_{std,p}$ and $\overline{Y}_{std,p}$ are respectively a width coordinate and a height coordinate of a centroid in a p region of the standard face, p regions are respectively a mouth Mouth region, a left eye Leye region, and a right eye Reye region, $X_{s,p}$ represents a width coordinate of the centroid in the p region of an $s^{th}$ frontal facial thermal infrared image, $Y_{s,p}$ represents a height coordinate of the centroid in the p region of the $s^{th}$ thermal infrared frontal facial image, and Q represents a total number of thermal infrared frontal facial images.

An affine transformation matrix is determined through the following formula:

$$\begin{bmatrix} X_{std,p} \\ Y_{std,p} \\ 1 \end{bmatrix} = \begin{bmatrix} a & b & c \\ d & e & f \\ 0 & 0 & 1 \end{bmatrix} \begin{bmatrix} x_p \\ y_p \\ 1 \end{bmatrix}$$

where, $(x_p, y_p)$ is respectively a width coordinate and a height coordinate of a centroid in a p region of the thermal infrared facial image to be recognized before face alignment, $$\begin{bmatrix} a & b & c \\ d & e & f \\ 0 & 0 & 1 \end{bmatrix}$$

is the affine transformation matrix, and a, b, c, d, e, and f are all parameters in the affine transformation matrix.

Affine transformation is performed on the thermal infrared facial image to be recognized according to the obtained affine transformation matrix to obtain the thermal infrared image after face alignment.

In an embodiment, a neural network for facial feature recognition is constructed to form a corresponding facial feature extraction. The facial feature extraction enables the degree of similarity of features of thermal infrared facial images of the same person to be high and the degree of similarity of features of thermal infrared facial images of different people to be low.

A loss function L of the facial feature extraction may adopt the two types below:

The first loss function is:

$$L = \|feature - HoC\|_2 - \|feature - HeC\|_2$$

where, feature is a feature of an input thermal infrared image extracted through the facial feature extraction, HoC is a category center feature of a category of the input thermal infrared image, and HeC is a category average feature of a certain category in which the input thermal infrared image is divided into. For a wrongly classified thermal infrared image, a distance between the feature extracted from the thermal infrared image and a category center thereof is decreased while a distance between the feature and a wrongly classified category center is increased.

The second loss function is:

$$L = \|feature - HoC\|_2$$

where, feature is the feature of the input thermal infrared image extracted by the facial feature extraction, and HoC is a feature vector of a category center of the input thermal infrared image. For the wrongly classified thermal infrared image, only the distance between the feature extracted from the thermal infrared image and the category center thereof is decreased.

It is understandable that in Step S150, a basic information database of the classifier may be continuously expanded. For example, when the classifier cannot recognize a person, it means that an internal face template of the classifier does not contain facial feature information of the person to be recognized, which may be recorded into the internal face template through active registration by the person, so that the facial recognition function of the classifier becomes more and more extensive.

Figure 4:
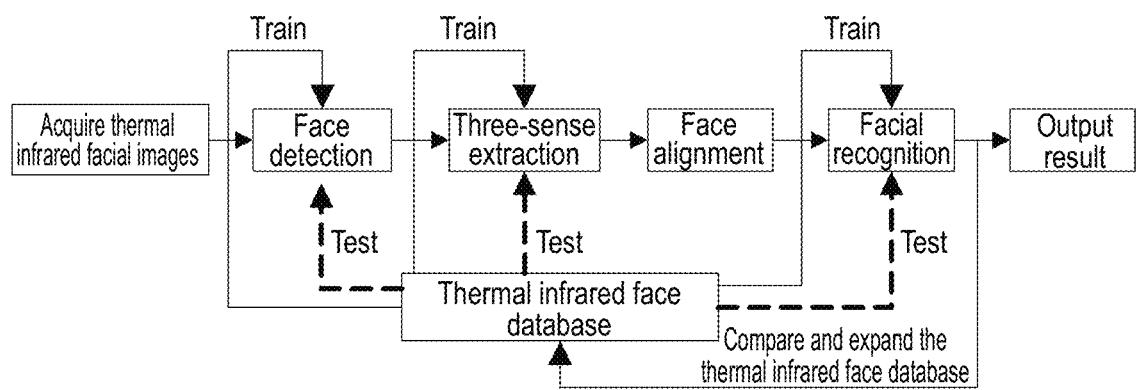
FIG. 4 is a structural diagram of a system for thermal infrared facial recognition according to the disclosure.

FIG. 4 is a structural diagram of a system for thermal infrared facial recognition according to the disclosure. The system includes several modules for acquiring thermal infrared facial images, face detection, three-sense extraction, face alignment, and facial recognition. In addition, a thermal infrared face database combines face detection, three-sense extraction, and facial recognition for training and testing. The thermal infrared face database is compared and expanded according to the results of facial recognition.

Figure 5:
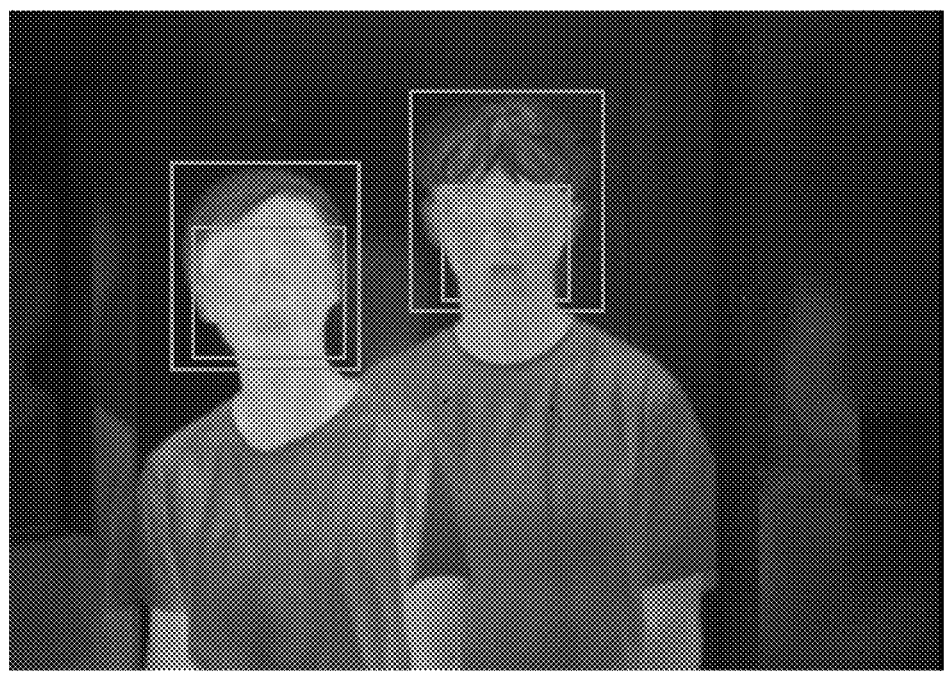
FIG. 5 is a schematic diagram of thermal infrared face detection according to the disclosure.

FIG. 5 is a schematic diagram of thermal infrared face detection according to the disclosure. In FIG. 5, the outer box represents a head and the inner box represents a face. The face may be obtained through first extracting the head and then extracting the face. Alternatively, the infrared image of the face may be directly obtained.

The disclosure adopts a conditional generating confrontation network model to generate a regional positioning map. The conditional generating confrontation network model is a deep learning technology that has emerged in recent years, and currently has a large number of applications in the field of image generation. Technologies such as artificial intelligence (AI) face-swapping are all derived from the research of generating confrontation network methods. In the generating confrontation network model, there are two networks, the generator network and the discriminator network. The generator network is configured to generate images, the discriminator network is configured to judge whether the input image is a real image or an image generated by the generator network, and output the probability that the input image is a real image.

$$\min_G \max_D V(D, G) = \log D(y, x) + \log(1 - D(G(x), x))$$

The above formula is the loss function adopted by the disclosure for training the generator network and the discriminator network. x is the input thermal infrared facial image, y is a real three-sense positioning map corresponding to x, G(x) is a false three-sense positioning map generated by the generator network, D ($\lambda$, x) is recognition of an input image pair {$\lambda$, x} by the discriminator network, and a real image pair {y, x} is judged when an output is close to 1 and a generated image pair {G(x),x} is judged when the output is close to 0.

When training, the two networks are alternately trained to improve the ability of the generator network in generating images while stimulating the discriminator network to improve the ability in distinguishing between real images and generated images. In addition, the improvement of the judgment ability of the discriminator network prompts the generator network to improve the generative ability. By alternately and repeatedly training, the generator network and the discriminator network continuously playing games with each other to improve their own ability. A good image generator is obtained when a discriminator can no longer judge whether the input image is a real image or a generated image.

Figure 6:
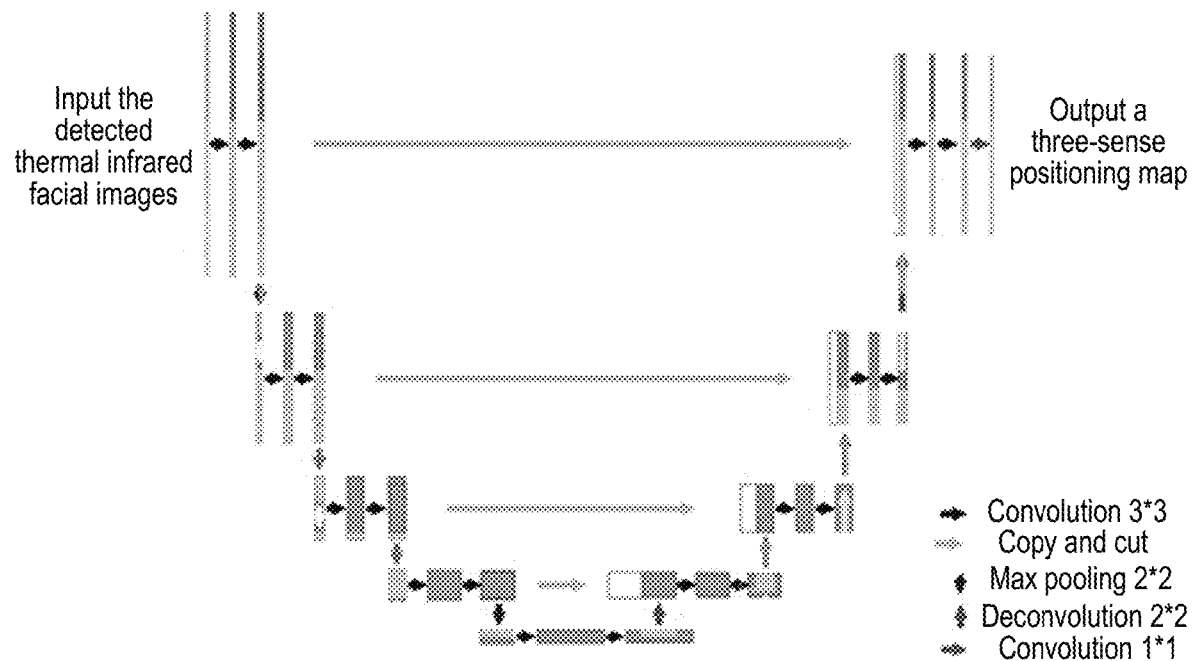
FIG. 6 is a structural diagram of a generator network according to the disclosure.
Figure 7:
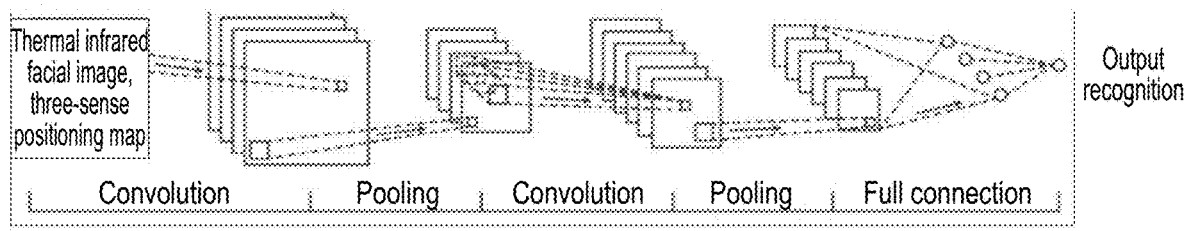
FIG. 7 is a structural diagram of a discriminator network according to the disclosure.

In the disclosure, the result of using the generator network is shown in FIG. 6, and the result of using the discriminator network is shown in FIG. 7.

Specifically, the step is divided into two parts, training and actual use.

The training part includes the following steps.

A preprocessing step of preparing n thermal infrared facial images as input for model training. For an input thermal infrared facial image $Img_i$, the following processing is performed.

Gray-scale normalization is performed on the thermal infrared facial image $Img_i$ to be recognized. The maximum gray value is taken as $MAX_i$ and the minimum gray value is taken as $MIN_i$. The following transformation is performed on all pixels of the image:

$$Img_i'' = \frac{Img_i - MAX_i}{MAX_i - MIN_i} \times 255$$

Zero filling is performed on a normalized thermal infrared facial image $Img_i''$ to be recognized. After the image is transformed into a square, scale transformation processing is performed on the image by adopting a bilinear interpolation method.

Figure 8:
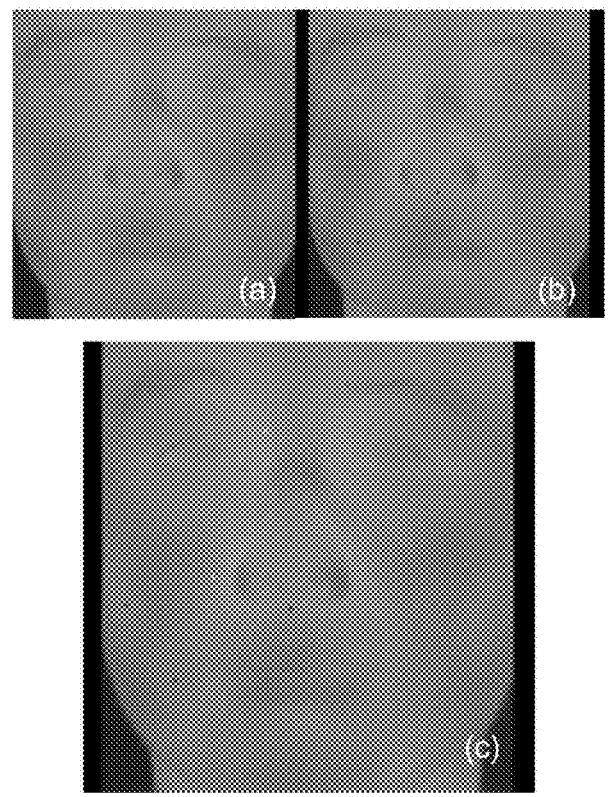
FIG. 8 is a schematic diagram of preprocessing result comparison of a thermal infrared image to be recognized according to the disclosure.

The normalization process is as shown in FIG. 8. In FIG. 8, Image (a) is an original image, Image (b) is a square image after pixel filling the original image, and Image (c) is formed by using the bilinear interpolation to complete the normalization.

For the $i^{th}$ image $Img_i$, the corresponding label is a real three-sense positioning map $Real_i$, and the three-sense positioning map generated by a generator network G inputting $Img_i$ is $Fake_i$.

Step ① of inputting the thermal infrared facial image $Img_i$ for training into the generator network to obtain the generated image $Fake_i$.

Step ② of sending {$Img_i$, $Fake_i$} into the discriminator network to obtain a result $D(Img_i,Fake_i)$ output by the discriminator network.

Step ③ of calculating the loss function of the generator:

$$loss\_G = (D(G(Img_i), Img_i) - 1.0)^2 + 100 \left( \sum_{m=0}^{255} \sum_{n=0}^{255} |G(Img_i)_{mn} - (Real_i)_{mn}| \right)$$

Step ④ of updating the generator network:

$$\nabla_\theta J_{(\theta)} = \nabla_\theta L(f(x)^{(i)}; \theta, y^{(i)})$$

$$\theta = \theta - \eta \nabla_\theta J_{(\theta)}$$

where, $\theta$ is a discriminator network parameter, $\eta$ is a learning rate, $L(f(x)^{(t)}; \theta, y^{(t)})$ is a network output, $f(x)$ is a network output value, and y is a label value.

Step ⑤ of calculating the loss function of the discriminator:

$$lossD\_real = (D(Real_i, Img_i) - 1.0)^2$$

$$lossD\_fake = (D(G(Img_i), Img_i) - 0.0)^2$$

$$loss\_D = \frac{1}{2} lossD\_real + \frac{1}{2} lossD\_fake$$

Step ⑥ of updating the discriminator network:

$$\nabla_\theta J_{(\theta)} = \nabla_\theta L(f(x)^{(i)}; \theta, y^{(i)})$$

$$\theta = \theta - \eta \nabla_\theta J_{(\theta)}$$

where, $\theta$ is the discriminator network parameter, $\eta$ is the learning rate, and $L(f(x)^{(t)}; \theta, y^{(t)})$ is the network output.

Step ⑦ of returning to Step ① to repeat the training for 200 times.

The actual use part includes the following steps.

A preprocessing step of selecting a total of 1000 front facial images of 149 people to be transformed into the same dimensions, and then superposing each pixel and averaging the pixels to obtain a standard face. The coordinates are fine-tuned, so that the connecting line between the centroids of the two eyes of the standard face is parallel to the X-axis, and the connecting line between the centroid of the mouth and the centroid of the nose is perpendicular to the X-axis.

For a three-sense generated image and a three-sense extracted image obtained from the thermal infrared facial images of the same image pair in the test set, error analysis of the key points of the face is performed through the following formula:

$$error=\Sigma_t|\dot{x}_t-x_t|+|\dot{y}_t-y_t|, t\in(Nose, Mouth, Leye, Reye)$$

where, error represents the error of the three-sense generated image compared with the three-sense extracted image, which is used as a criterion for the evaluation of the network model generation effect, $(\dot{x}_t, \dot{y}_t)$ represents coordinates of the key points of the face of the three-sense extracted image, $\dot{x}_t$ and $\dot{y}_t$ respectively represent a width coordinate and a height coordinate, $(x_t, y_t)$ represents coordinates of the key points of the face of the three-sense generated image, and $x_t$ and $y_t$ respectively represent a width coordinate and a height coordinate.

The error analysis is performed on all the three-sense extracted images and the obtained three-sense generated images in the test set to respectively obtain errors error.

An average error $\overline{error}$ is obtained as follows:

$$\overline{error}=\frac{1}{N}\sum_{n=1}^{N}error_n$$

where, N is the total number of image pairs in the test set, $$\overline{error}=\frac{1}{N}\sum_{n=1}^{N}error_n$$

is an error of an $n^{th}$ image, and $1 \le n \le N$.

If the average error $\overline{error} \le \delta$, then face correction is performed on the thermal infrared image, where $\delta$ is a set error threshold.

After obtaining coordinate information of calibrated key points of each three-sense calibrated image, key point coordinates $(\overline{X}_{std,p}, \overline{Y}_{std,p})$ of a corrected standard facial image are obtained as follows:

$$\overline{X}_{std,p}=\frac{1}{Q}\sum_{s=1}^{Q}X_{s,p}, p \in (Mouth, Leye, Reye)$$

$$\overline{Y}_{std,p}=\frac{1}{Q}\sum_{s=1}^{Q}Y_{s,p}, p \in (Mouth, Leye, Reye)$$

where, $\overline{X}_{std,p}$ and $\overline{Y}_{std,p}$ are respectively a width coordinate and a height coordinate, $\overline{X}_{s,p}$ represents the width coordinate of the p region of an $s^{th}$ three-sense calibrated image, $\overline{Y}_{s,p}$ represents the height coordinate of the p region of the $s^{th}$ three-sense calibrated image, and Q represents the total number of three-sense calibrated images.

Deviation analysis of the generated key points and the calibrated key points is performed through the experimental verification of a large number of thermal infrared facial images. As shown in Table 1, it can be concluded from the experimental results that the average error $\overline{error} \le 4$ pixel values, which is difficult to distinguish with the naked eye and meets the engineering error requirements.

TABLE 1

| Number of test samples | Average deviation of nose | | Average deviation of mouth | | Average deviation of left eye | | Average deviation of right eye | |
|---|---|---|---|---|---|---|---|---|
| | $x_{avg}$ | $y_{avg}$ | $x_{avg}$ | $y_{avg}$ | $x_{avg}$ | $y_{avg}$ | $x_{avg}$ | $y_{avg}$ |
| 100 | 0.5 | 0.25 | 0.35 | 0.5 | 0 | 0.1 | 0.7 | 0.2 |

At this time, a point set {left eye, right eye, nose, mouth} has been obtained, and {left eye, right eye, mouth} is selected as the reference point for the calculation of the affine transformation matrix. The affine transformation matrix is calculated using the point set and a point set of the standard face:

$$\begin{bmatrix} X_{std,p} \\ Y_{std,p} \\ 1 \end{bmatrix} = \begin{bmatrix} a & b & c \\ d & e & f \\ 0 & 0 & 1 \end{bmatrix} \begin{bmatrix} x_p \\ y_p \\ 1 \end{bmatrix}$$

Figure 9:
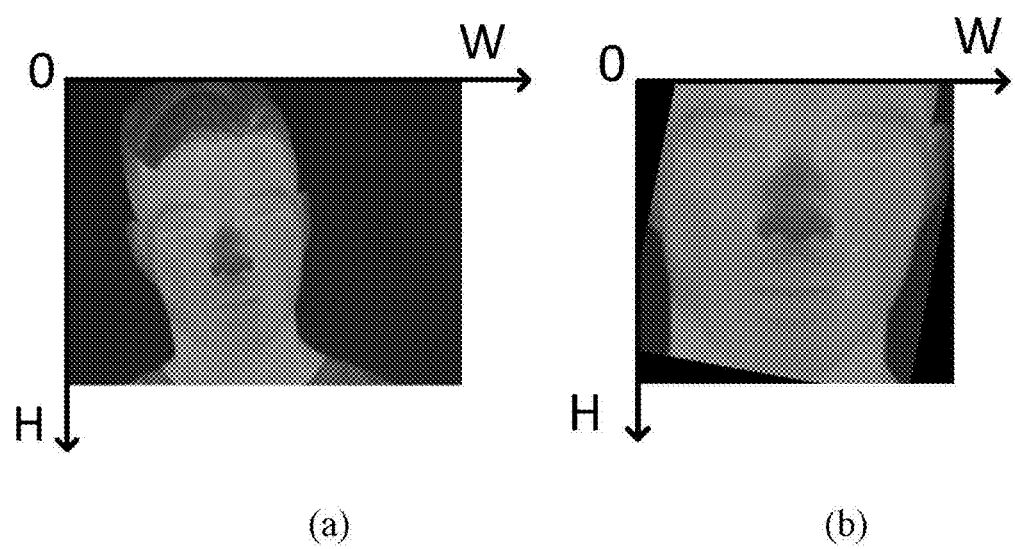
FIG. 9 is a diagram of results before and after face alignment according to the disclosure.

After obtaining the affine transformation matrix, affine transformation is performed on the image to be aligned, which is output to obtain an aligned image. As shown in FIG. 9, Image (a) on the left of FIG. 9 is the image to be aligned, and Image (b) on the right of FIG. 9 is the aligned image. In a coordinate system of a pixel point, W is a width of the image, H is a height of the image, and 0 is a starting point of pixel coordinates of the image.

Figure 10:
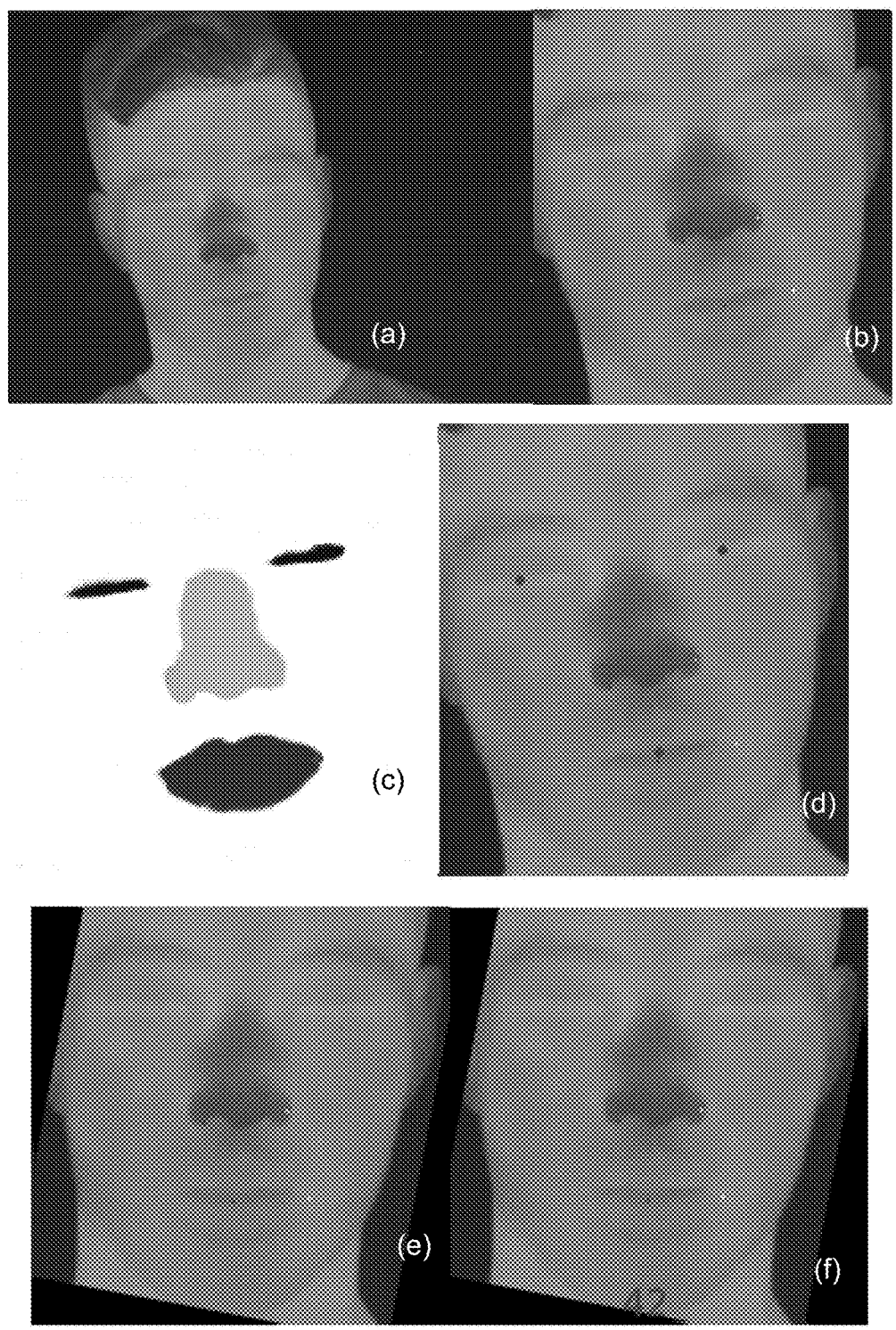
FIG. 10 is a schematic diagram of a complete process of facial recognition according to the disclosure.

FIG. 10 is a schematic diagram of a complete process of facial recognition according to the disclosure. As shown in FIG. 10, Image (a) is a detected original thermal infrared image, Image (b) is a cropped thermal infrared facial image, Image (c) shows an image after the thermal infrared facial image is converted into three channels, Image (d) is obtained key region group information (coordinates of left eye centroid, right eye centroid, and mouth centroid coordinates) of the face, Image (e) is an image after face alignment calibration, and Image (f) is a label of a person corresponding to a recognized face. Specifically, the subscript "42" in Image (f) of FIG. 10 indicates that the recognized face in the embodiment belongs to the person whose label is 42.

Preferably, in Step ④, a feature extraction with good performance is trained. The feature extraction should have the following functions. For an image within a certain category, a feature extracted by the feature extraction should be as close as possible to a feature vector of a category center. For an image within a certain category, a feature extracted by the feature extraction should be as far away as possible from feature vectors of category centers of other categories. The threshold is set based on the above two points. It is judged as the same person when the distance is lower than the threshold, and rejection is performed when the distance is higher than the threshold. In order for the feature extraction to achieve the above effects, the disclosure designs the following two loss functions for the training of the feature extraction:

The first loss function is:

$$L=\|feature-HoC\|_2-\|feature-HeC\|_2$$

where, feature is a feature of the input thermal infrared image extracted through the facial feature extraction, HoC is a feature vector of a category center of a category of the input thermal infrared image, and HeC is a feature vector of a category center of a category in which the input thermal infrared image is divided into. If the input thermal infrared image is classified correctly, the value of the loss function is zero, and no adjustment is made to the entire network.

For a wrongly classified thermal infrared image, a distance between the feature extracted from the thermal infrared image and a category center thereof is decreased while a distance between the feature and a wrongly classified category center is increased.

The second loss function is:

$$L = \|\text{feature} - HoC\|_2$$

where, feature is the feature of the input thermal infrared image extracted by the facial feature extraction, and HoC is a feature vector of the category center of the input thermal infrared image. For the wrongly classified thermal infrared image, only the distance between the feature extracted from the thermal infrared image and the category center thereof is decreased.

Figure 11:
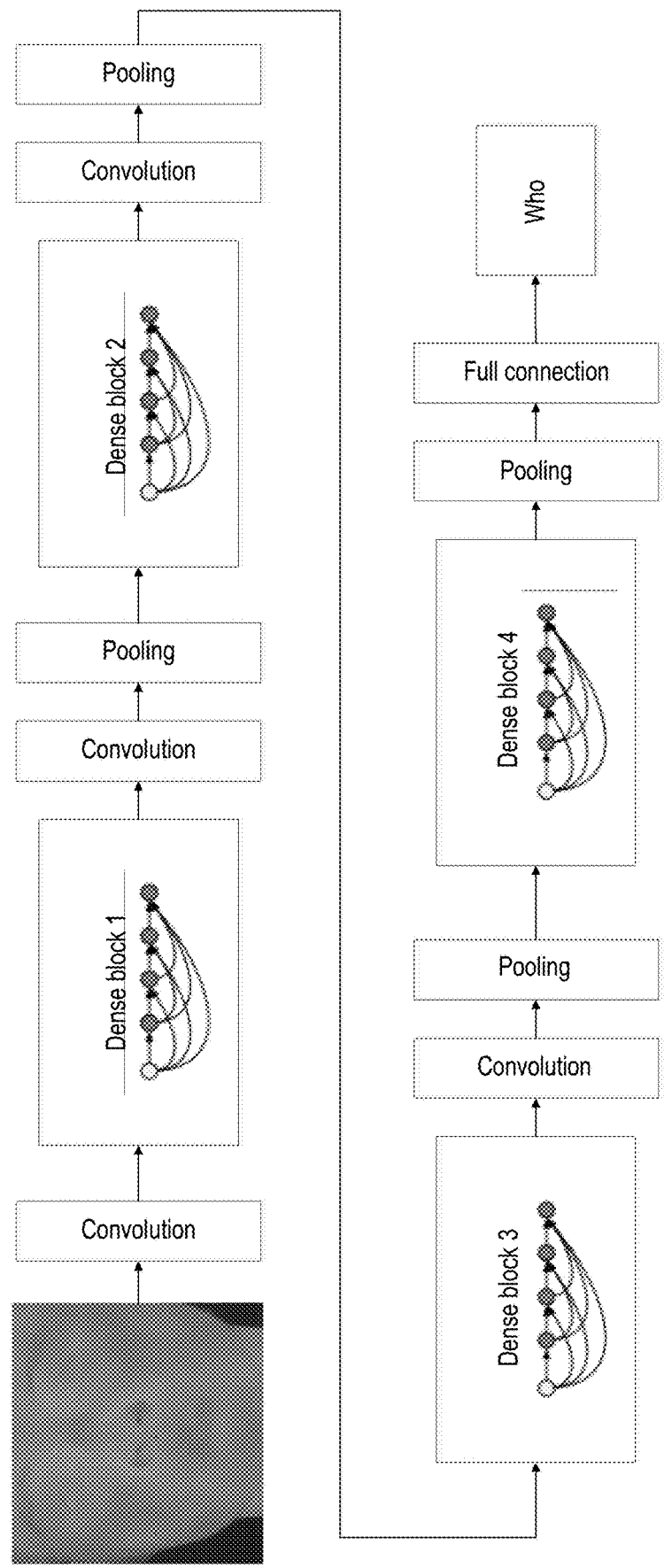
FIG. 11 is a structural diagram of a facial feature extraction according to the disclosure.

The network architecture of the feature extraction selected by the disclosure is shown in FIG. 11. The network architecture of the feature extraction includes 4 dense blocks. Multiple dense blocks are included, so that the dimensions of feature images in each dense block are consistent, so there is no issue with dimensions when cascading.

Figure 12:
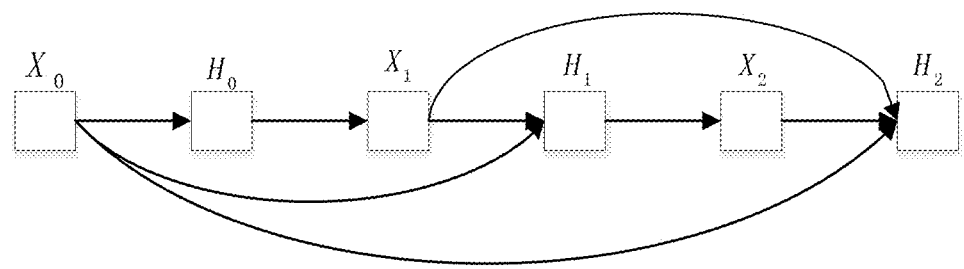
FIG. 12 is a schematic diagram of characteristics of the facial feature extraction according to the disclosure.

FIG. 12 shows the dense blocks of a feature extraction network. In the dense block, each layer is additionally added with features extracted from the previous layer, that is:

$$x_1 = H_i(x_0)$$

$$x_2 = H_2([x_0, x_1])$$

$$\ldots$$

$$x_n = H_n([x_0, x_1 \ldots x_{n-1}])$$

where, $x_i$ is an output of an $i^{th}$ layer, and $H_i$ is a non-linear activation function of the $i^{th}$ layer.

The feature extraction network can make full use of the features extracted from each layer, thereby effectively improving the recognition ability of the model.

Specifically, the step is divided into two parts, training and testing. In the technology, the training part adopts 149 people, each with 50 sheets, so there is a total of 7450 sheets as a training data set, which is numbered from 0 to 148 according to the number of different people as the labels thereof.

The test part adopts 149 people, each with 20 sheets, so there is a total of 2980 sheets as a test data set. The test data set is numbered from 0 to 148 according to the number of different people as the labels thereof.

The training part includes the following steps.

A data preprocessing step of performing face alignment on the thermal infrared facial images $Img_i$ to be recognized in the training set and the test set to obtain the aligned thermal infrared facial image $Img_i$ to be recognized.

Step ① of initializing network parameters of the feature extraction, inputting the thermal infrared image of the training set into the feature extraction, and calculating feature vectors of category centers of various categories as follows:

$$Hoc_n = \frac{1}{M}\sum_{m=1}^{M} Fextrac(Img_n^m) \ldots (n = 0, 1, 2 \ldots 148)$$

where, $Hoc_n$ is a feature vector of a category center of an $n^{th}$ person, and M is the total amount of thermal infrared images of the $n^{th}$ person.

Step ② of inputting the thermal infrared image $Img_i$ in the training set into the feature extraction, and obtaining 1×1000 output feature vector $Fextrac(Img_i)$.

Step ③ of calculating a distance between the feature vector and the feature vector of each category center, and selecting a category corresponding to the feature vector of the category center with the smallest distance as a prediction result.

$$Dist_{i,n} = \|Fextrac(Img_i) - Hoc_n\|_2 \ldots n = 0, 1, 2 \ldots 148$$

$$Dist_{i,m} = \min(Dist_{i,1}, Dist_{i,2}, \ldots Dist_{i,148})$$

$$Pred_i = m$$

where, $Dist_{i,n}$ is the Euclidean distance between a feature of an $i^{th}$ input thermal infrared image and a feature vector of a category center of a category m, and $Pred_i$ is the corresponding prediction result.

Step ④ of calculating a loss function:

$$loss = \|Fextrac(Img_i) - Hoc(real_i)\|_2 - \|Fextrac(Img_i) - Hoc(pred_i)\|_2$$

where, $Real_i$ is a real category of $Img_i$.

Step ⑤ of updating parameters of the feature extraction network using the loss obtained function. As follows:

$$\nabla_\theta J_{(\theta)} = \nabla_\theta L(f(x)^{(i)}; \theta, y^{(i)})$$

$$\theta = \theta - \eta \nabla_\theta J_{(\theta)}$$

where, $\theta$ is a feature extraction network parameter, $\eta$ is a learning rate, and taking 0.001, $L(f(x)^{(i)}; \theta, y^{(i)})$ is a network output.

Step ⑥ of recalculating the feature vectors of the category centers of various categories:

$$Hoc_n = \frac{1}{M}\sum_{m=1}^{M} Fextrac(Img_n^m) \ldots (n = 0, 1, 2 \ldots 148)$$

Step ⑦ of returning to Step ② to continue training until all the thermal infrared images in the training set have been used for training. The feature extraction is trained for 100 times with such manner, so that the feature extraction can extract the features we expect.

The test part includes the following steps.

Step ① of inputting the thermal infrared image $Img_i$ into the training set into the feature extraction to obtain 1×1000 output feature vector $Fextrac(Img_i)$.

Step ② of calculating the distance between the feature vector and the feature vector of each category center, and selecting the category corresponding to the feature vector of the category center with the smallest distance as the prediction result.

$$Dist_{i,n} = \|Fextrac(Img_i) - Hoc_n\|_2 \ldots n = 0, 1, 2 \ldots 148$$

$$Dist_{i,m} = \min(Dist_{i,1}, Dist_{i,2}, \ldots Dist_{i,148})$$

$$Pred_i = m$$

Under the technology, the accuracy rate of top-1 on the training set is 99.499% and the accuracy rate of top-1 on the test set is 99.306%.

Specifically, the neural network outputs the name or the label of the judged person. The recognition accuracy of the disclosure on autonomous thermal infrared facial data set is 99.37%.

Figure 13:
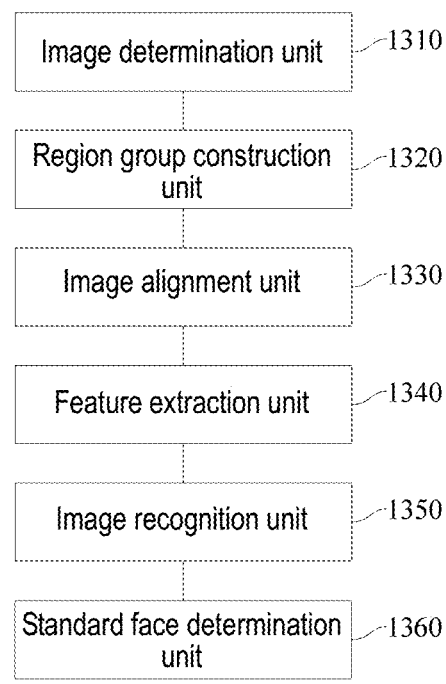
FIG. 13 is an architectural diagram of a system for thermal infrared facial recognition according to the disclosure.

FIG. 13 is an architectural diagram of a system for thermal infrared facial recognition according to the disclosure. As shown in FIG. 13, the system includes the following.

An image determination unit 1310 is configured to determine a thermal infrared facial image to be recognized.

A region group construction unit 1320 is configured to input the thermal infrared facial image to be recognized into a trained three-sense component extractor to position eyes, a nose, and a mouth of a face in the image, and to perform regional positioning of a left eye, a right eye, the nose, and the mouth, so as to constitute a corresponding key region group. The key region group further includes centroid coordinates of a mouth region, centroid coordinates of a nose region, centroid coordinates of a left eye region, and centroid coordinates of a right eye region.

An image alignment unit 1330 is configured to perform affine transformation on the thermal infrared facial image to be recognized according to a difference between a key region group of a standard face and the key region group of the face to be recognized, so as to obtain a thermal infrared image after face alignment calibration.

A feature extraction unit 1340 inputs the thermal infrared image after face alignment calibration to a trained facial feature extraction to extract corresponding facial features.

An image recognition unit 1350 is configured to input the extracted facial features into a trained classifier to recognize information of an owner.

In an embodiment, the region group construction unit 1320 positions eye, nose, and mouth regions of the face using the following equations:

$$\text{Area}_{Nose}=\{C(x,y)=[RGB_{Nose}]|0\le x\le W, 0\le y\le H\}$$

$$\text{Area}_{Mouth}=\{C(x,y)=[RGB_{Mouth}]|0\le x\le W, 0\le y\le H\}$$

$$\text{Area}_{Eyes}=\{C(x,y)=[RGB_{Eyes}]|0\le x\le W, 0\le y\le H\}$$

where, $\text{Area}_{Nose}$ represents the nose region, $\text{Area}_{Mouth}$ represents the mouth region, and $\text{Area}_{Eyes}$ represents the eye region, which includes a left eye region and a right eye region; x and y respectively represent a width coordinate and a height coordinate of each pixel in the thermal infrared facial image under an image plane rectangular coordinate system, and C(x, y) represents a channel value at coordinates (x, y) in the thermal infrared facial image after being converted into three channels; W is a width of the thermal infrared image, H is a height of the thermal infrared image, R, G, and B respectively represent a red channel value, a green channel value, and a blue channel value, and $RGB_{Nose}$, $RGB_{Mouth}$, and $RGB_{Eyes}$ respectively represent color values of the nose, the mouth, and the eyes.

A standard face determination unit 1360 is configured to obtain a standard thermal infrared facial image through superposing and averaging pixels of multiple thermal infrared frontal facial images of multiple people. A connecting line of a centroid of a left eye region and a centroid of a right eye region of a standard face is parallel to the X-axis of the image plane rectangular coordinate system, and a connecting line of a centroid of a nose region and a centroid of a mouth region of the standard face is parallel to the Y-axis of the image plane rectangular coordinate system.

The region group construction unit 1320 is further configured to input a thermal infrared image of the standard face into the trained three-sense component extractor to obtain a key region group of the standard face, which includes centroid coordinates of the mouth region, centroid coordinates of the nose region, centroid coordinates of the left eye region, and centroid coordinates of the right eye region.

Specifically, for the functions of each unit in FIG. 13, please refer to the detailed introduction in the foregoing method embodiment, which is not repeated here.

Those skilled in the art can easily understand that the above descriptions are only preferred embodiments of the disclosure and are not intended to limit the disclosure. Any modification, equivalent replacement, improvement, etc. made within the spirit and principle of the disclosure should be included in the protection scope of the disclosure.

What is claimed is:

1. A method for thermal infrared facial recognition, characterized by comprising:
   determining a thermal infrared facial image to be recognized;
   inputting the thermal infrared facial image to be recognized into a trained three-sense component extractor to position eyes, a nose, and a mouth of a face in the image, and to perform regional positioning of a left eye, a right eye, the nose, and the mouth, so as to constitute a corresponding key region group, wherein the key region group further comprises coordinates of a centroid of a mouth region, coordinates of a centroid of a left eye region, and coordinates of a centroid of a right eye region;
   performing affine transformation on the thermal infrared facial image to be recognized using a difference between a key region group of a standard face and the key region group of the face to be recognized, so as to obtain a thermal infrared image after face alignment calibration;
   inputting the thermal infrared image after face alignment calibration into a trained facial feature extraction to extract corresponding facial features; and
   inputting the extracted facial features into a trained classifier to recognize information of an owner.

2. The method for thermal infrared facial recognition according to claim 1, characterized in that the trained three-sense component extractor adopts following equations to position the eye, nose, and mouth regions on the thermal infrared facial image:

$$\text{Area}_{Nose}=\{C(x,y)=[RGB_{Nose}]|0\le x\le W, 0\le y\le H\}$$

$$\text{Area}_{Mouth}=\{C(x,y)=[RGB_{Mouth}]|0\le x\le W, 0\le y\le H\}$$

$$\text{Area}_{Eyes}=\{C(x,y)=[RGB_{Eyes}]|0\le x\le W, 0\le y\le H\}$$

where, $\text{Area}_{Nose}$ represents the nose region, $\text{Area}_{Mouth}$ represents the mouth region, and $\text{Area}_{Eyes}$ represents the eye region, which comprises a left eye region and a right eye region; x and y respectively represent a width coordinate and a height coordinate of each pixel in the thermal infrared facial image under an image plane rectangular coordinate system, and C(x, y) represents a channel value at coordinates (x, y) in the thermal infrared facial image after the thermal infrared image is converted into three channels; W is a width of the thermal infrared image, H is a height of the thermal infrared image, R, G, and B respectively represent a red channel value, a green channel value, and a blue channel value, and $RGB_{Nose}$, $RGB_{Mouth}$, and $RGB_{Eyes}$ respectively represent color values of the nose, the mouth, and the eyes.

3. The method for thermal infrared facial recognition according to claim 2, characterized in that a centroid of the nose region is:

$$\begin{cases} \overline{X_{nose}} = \dfrac{1}{Nose_{total}} \sum_j x_j, \forall (x_j, y_j) \in Area_{Nose} \\ \overline{Y_{nose}} = \dfrac{1}{Nose_{total}} \sum_j y_j, \forall (x_j, y_j) \in Area_{Nose} \end{cases}$$

where, $(\overline{X_{Nose}}, \overline{Y_{nose}})$ represents coordinates of the centroid of the nose region; and $Nose_{total}$ represents a total number of pixels within the nose region, $x_j$ represents a width coordinate of a $j^{th}$ pixel in the nose region, and $y_j$ represents a height coordinate of the $j^{th}$ pixel in the nose region; and the centroid of the mouth region is:

$$\begin{cases} \overline{X_{Mouth}} = \dfrac{1}{Mouth_{total}} \sum_k x_k, \forall (x_k, y_k) \in Area_{Mouth} \\ \overline{Y_{Mout}} = \dfrac{1}{Mouth_{total}} \sum_k y_k, \forall (x_k, y_k) \in Area_{Mouth} \end{cases}$$

where, $(\overline{X_{mouth}}, \overline{Y_{mouth}})$ represents coordinates of the centroid of the mouth region; and $Mouth_{total}$ represents a total number of pixels within the mouth region, $x_k$ represents a width coordinate of a $k^{th}$ pixel in the mouth region, and $y_k$ represents a height coordinate of the $k^{th}$ pixel in the mouth region.

4. The method for thermal infrared facial recognition according to claim 3, characterized in that the eye region is divided into the left eye region and the right eye region by adopting a connecting line of the centroid of the mouth region and the centroid of the nose region, and the specific division is as follows:

$$Area_{Leye} =$$

$$\left\{ C(u,v) = [RGB_{Eyes}] \,\middle|\, 0 \le u \le \dfrac{(\overline{X_{Mouth}} - \overline{X_{Nose}})*(v - \overline{Y_{nose}})}{\overline{Y_{Mout}} - \overline{Y_{nose}}} + \overline{X_{nose}}, \right.$$

$$\left. 0 \le v \le H \right\}$$

$$Area_{Reye} = \left\{ C(u,v) = [RGB_{Eyes}] \,\middle|\, \right.$$

$$\left. \dfrac{(\overline{X_{Mou}} - \overline{X_{Nose}})*(v - \overline{Y_{nose}})}{\overline{Y_{Mout}} - \overline{X_{nose}}} + \overline{Y_{nose}} \le u \le W, 0 \le v \le H \right\}$$

where, $Area_{Leye}$ represents the left eye region, and $Area_{Reye}$ represents the right eye region; and the coordinates of the centroid of the left eye region and the coordinates of the centroid of the right eye region are respectively:

$$\begin{cases} \overline{X_{Leye}} = \dfrac{1}{Leye_{total}} \sum_l x_l, \forall (x_l, y_l) \in Area_{Leye} \\ \overline{Y_{Leye}} = \dfrac{1}{Leye_{total}} \sum_l y_l, \forall (x_l, y_l) \in Area_{Leye} \end{cases}$$

-continued $$\begin{cases} \overline{X_{Reye}} = \dfrac{1}{Reye_{total}} \sum_r x_r, \forall (x_r, y_r) \in Area_{Reye} \\ \overline{Y_{Reye}} = \dfrac{1}{Reye_{total}} \sum_r y_r, \forall (x_r, y_r) \in Area_{Reye} \end{cases}$$

where, $(\overline{X_{Leye}}, \overline{Y_{Leye}})$ is the coordinates of the centroid of the left eye region, $\overline{X_{Leye}}$ and $\overline{Y_{Leye}}$ are respectively a width value and a height value of the left eye region, $Leye_{total}$ represents a sum of pixels in the left eye region, $x_l$ represents a width coordinate of an $l^{th}$ pixel in the left eye region, and $y_l$ represents a height coordinate of the $l^{th}$ pixel in the left eye region; and $(\overline{X_{Reye}}, \overline{Y_{Reye}})$ is the coordinates of the centroid of the right eye region, $\overline{X_{Reye}}$ and $\overline{Y_{Reye}}$ are respectively a width value and a height value of the right eye region, $Reye_{total}$ represents a sum of pixels in the right eye region, $x_r$ represents a width coordinate of a $r^{th}$ pixel in the right eye region, and $y_r$ represents a height coordinate of the $r^{th}$ pixel in the right eye region.

5. The method for thermal infrared facial recognition according to claim 3, characterized by comprising:

obtaining a thermal infrared image of a standard face through superposing and averaging pixels of a plurality of thermal infrared frontal facial images of a plurality of people, wherein the connecting line of the centroid of the left eye region and the centroid of the right eye region of the standard face is parallel to an X-axis of the image plane rectangular coordinate system, and the connecting line of the centroid of the nose region and the centroid of the mouth region of the standard face is parallel to a Y-axis of the image plane rectangular coordinate system;

inputting the thermal infrared image of the standard face into the trained three-sense component extractor to obtain the key region group of the standard face, comprising the coordinates of the centroid of the mouth region, the coordinates of the centroid of the left eye region, and the coordinates of the centroid of the right eye region;

performing affine transformation on the thermal infrared facial image to be recognized according to a difference between the key region group of the standard face and the key region group of the face to be recognized, specifically comprising:

determining coordinates of the key region group of the standard face:

$$\overline{X}_{std,p} = \dfrac{1}{Q} \sum_{s=1}^{Q} \overline{X}_{s,p}, \, p \in (Mouth, Leye, Reye)$$

$$\overline{Y}_{std,p} = \dfrac{1}{Q} \sum_{s=1}^{Q} \overline{Y}_{s,p}, \, p \in (Mouth, Leye, Reye)$$

where $\overline{X}_{std,p}$ and $\overline{Y}_{std,p}$ are respectively a width coordinate and a height coordinate of a centroid in a p region of the standard face, p regions are respectively a mouth Mouth region, a left eye Leye region, and a right eye Reye region, $\overline{X}_{s,p}$ represents a width coordinate of the centroid in the p region of an $s^{th}$ frontal facial thermal infrared image, $\overline{Y}_{s,p}$ represents a height coordinate of the centroid in the p region of the $s^{th}$ thermal infrared frontal facial image, and Q represents a total number of thermal infrared frontal facial images;

determining an affine transformation matrix through a following formula:

$$\begin{bmatrix} X_{std,p} \\ Y_{std,p} \\ 1 \end{bmatrix} = \begin{bmatrix} a & b & c \\ d & e & f \\ 0 & 0 & 1 \end{bmatrix} \begin{bmatrix} x_p \\ y_p \\ 1 \end{bmatrix}$$

where, $(x_p, y_p)$ is respectively a width coordinate and a height coordinate of the centroid in the p region of the thermal infrared facial image to be recognized before face alignment, $$\begin{bmatrix} a & b & c \\ d & e & f \\ 0 & 0 & 1 \end{bmatrix}$$

is the affine transformation matrix, and a, b, c, d, e, and f are all parameters in the affine transformation matrix; and performing the affine transformation on the thermal infrared facial image to be recognized using the obtained affine transformation matrix to obtain the thermal infrared image after face alignment calibration.

6. The method for thermal infrared facial recognition according to claim 1, characterized in that a neural network for facial feature recognition is constructed to form a corresponding facial feature extraction; the facial feature extraction enables a degree of similarity of features of thermal infrared facial images of a same person to be high and a degree of similarity of features of thermal infrared facial images of different people to be low;

a loss function L of the facial feature extraction may adopt two types below:

a first loss function is:

$$L=\|\text{feature}-HoC\|_2-\|\text{feature}-HeC\|_2$$

where, feature is a feature of an input thermal infrared image extracted through the facial feature extraction, HoC is a category center feature of a category of the input thermal infrared image, and HeC is a category average feature of a certain category in which the input thermal infrared image is divided into; for a wrongly classified thermal infrared image, a distance between the feature extracted from the thermal infrared image and a category center thereof is decreased while a distance between the feature and a wrongly classified category center is increased; and a second loss function is:

$$L=\|\text{feature}-HoC\|_2$$

where, feature is the feature of the input thermal infrared image extracted by the facial feature extraction, and HoC is a feature vector of a category center of the input thermal infrared image; and for the wrongly classified thermal infrared image, only the distance between the feature extracted from the thermal infrared image and the category center thereof is decreased.

7. The method for thermal infrared facial recognition according to claim 2, characterized in that a neural network for facial feature recognition is constructed to form a corresponding facial feature extraction; the facial feature extraction enables a degree of similarity of features of thermal infrared facial images of a same person to be high and a degree of similarity of features of thermal infrared facial images of different people to be low;

a loss function L of the facial feature extraction may adopt two types below:

a first loss function is:

$$L=\|\text{feature}-HoC\|_2-\|\text{feature}-HeC\|_2$$

where, feature is a feature of an input thermal infrared image extracted through the facial feature extraction, HoC is a category center feature of a category of the input thermal infrared image, and HeC is a category average feature of a certain category in which the input thermal infrared image is divided into; for a wrongly classified thermal infrared image, a distance between the feature extracted from the thermal infrared image and a category center thereof is decreased while a distance between the feature and a wrongly classified category center is increased; and a second loss function is:

$$L=\|\text{feature}-HoC\|_2$$

where, feature is the feature of the input thermal infrared image extracted by the facial feature extraction, and HoC is a feature vector of a category center of the input thermal infrared image; and for the wrongly classified thermal infrared image, only the distance between the feature extracted from the thermal infrared image and the category center thereof is decreased.

8. The method for thermal infrared facial recognition according to claim 3, characterized in that a neural network for facial feature recognition is constructed to form a corresponding facial feature extraction; the facial feature extraction enables a degree of similarity of features of thermal infrared facial images of a same person to be high and a degree of similarity of features of thermal infrared facial images of different people to be low;

a loss function L of the facial feature extraction may adopt two types below:

a first loss function is:

$$L=\|\text{feature}-HoC\|_2-\|\text{feature}-HeC\|_2$$

where, feature is a feature of an input thermal infrared image extracted through the facial feature extraction, HoC is a category center feature of a category of the input thermal infrared image, and HeC is a category average feature of a certain category in which the input thermal infrared image is divided into; for a wrongly classified thermal infrared image, a distance between the feature extracted from the thermal infrared image and a category center thereof is decreased while a distance between the feature and a wrongly classified category center is increased; and a second loss function is:

$$L=\|\text{feature}-HoC\|_2$$

where, feature is the feature of the input thermal infrared image extracted by the facial feature extraction, and HoC is a feature vector of a category center of the input thermal infrared image; and for the wrongly classified thermal infrared image, only the distance between the feature extracted from the thermal infrared image and the category center thereof is decreased.

9. The method for thermal infrared facial recognition according to claim 4, characterized in that a neural network for facial feature recognition is constructed to form a corresponding facial feature extraction; the facial feature extraction enables a degree of similarity of features of thermal infrared facial images of a same person to be high and a degree of similarity of features of thermal infrared facial images of different people to be low;
a loss function L of the facial feature extraction may adopt two types below:
a first loss function is:

$$L = \|\text{feature} - HoC\|_2 - \|\text{feature} - HeC\|_2$$

where, feature is a feature of an input thermal infrared image extracted through the facial feature extraction, HoC is a category center feature of a category of the input thermal infrared image, and HeC is a category average feature of a certain category in which the input thermal infrared image is divided into; for a wrongly classified thermal infrared image, a distance between the feature extracted from the thermal infrared image and a category center thereof is decreased while a distance between the feature and a wrongly classified category center is increased; and
a second loss function is:

$$L = \|\text{feature} - HoC\|_2$$

where, feature is the feature of the input thermal infrared image extracted by the facial feature extraction, and HoC is a feature vector of a category center of the input thermal infrared image; and for the wrongly classified thermal infrared image, only the distance between the feature extracted from the thermal infrared image and the category center thereof is decreased.

10. The method for thermal infrared facial recognition according to claim 5, characterized in that a neural network for facial feature recognition is constructed to form a corresponding facial feature extraction; the facial feature extraction enables a degree of similarity of features of thermal infrared facial images of a same person to be high and a degree of similarity of features of thermal infrared facial images of different people to be low;
a loss function L of the facial feature extraction may adopt two types below:
a first loss function is:

$$L = \|\text{feature} - HoC\|_2 - \|\text{feature} - HeC\|_2$$

where, feature is a feature of an input thermal infrared image extracted through the facial feature extraction, HoC is a category center feature of a category of the input thermal infrared image, and HeC is a category average feature of a certain category in which the input thermal infrared image is divided into; for a wrongly classified thermal infrared image, a distance between the feature extracted from the thermal infrared image and a category center thereof is decreased while a distance between the feature and a wrongly classified category center is increased; and
a second loss function is:

$$L = \|\text{feature} - HoC\|_2$$

where, feature is the feature of the input thermal infrared image extracted by the facial feature extraction, and HoC is a feature vector of a category center of the input thermal infrared image;
and for the wrongly classified thermal infrared image, only the distance between the feature extracted from the thermal infrared image and the category center thereof is decreased.

11. A system for thermal infrared facial recognition, characterized by comprising:

an image determination unit, configured to determine a thermal infrared facial image to be recognized;
a region group construction unit, configured to input the thermal infrared facial image to be recognized into a trained three-sense component extractor to position eyes, a nose, and a mouth of a face in the image, and to perform regional positioning of a left eye, a right eye, the nose, and the mouth, so as to constitute a corresponding key region group, wherein the key region group further comprises coordinates of a centroid of a mouth region, coordinates of a centroid of a left eye region, and coordinates of a centroid of a right eye region;
an image alignment unit, configured to perform affine transformation on the thermal infrared facial image to be recognized according to a difference between a key region group of a standard face and the key region group of the face to be recognized, so as to obtain a thermal infrared image after face alignment calibration;
a feature extraction unit, for inputting the thermal infrared image after face alignment calibration into a trained facial feature extraction to extract corresponding facial features; and
an image recognition unit, configured to input the extracted facial features into a trained classifier to recognize information of an owner.

12. The system for thermal infrared facial recognition according to claim 11, characterized in that the region group construction unit adopts following equations to position eye, nose, and mouth regions on the thermal infrared facial image:

$$\text{Area}_{Nose} = \{C(x,y) = [RGB_{Nose}] | 0 \leq x \leq W, 0 \leq y \leq H\}$$

$$\text{Area}_{Mouth} = \{C(x,y) = [RGB_{Mouth}] | 0 \leq x \leq W, 0 \leq y \leq H\}$$

$$\text{Area}_{Eyes} = \{C(x,y) = [RGB_{Eyes}] | 0 \leq x \leq W, 0 \leq y \leq H\}$$

where, $\text{Area}_{Nose}$ represents the nose region, $\text{Area}_{Mouth}$ represents the mouth region, and $\text{Area}_{Eyes}$ represents the eye region, which comprises a left eye region and a right eye region; x and y respectively represent a width coordinate and a height coordinate of each pixel in the thermal infrared facial image under an image plane rectangular coordinate system, and C(x, y) represents a channel value at coordinates (x, y) in the thermal infrared facial image after the thermal infrared image is converted into three channels; W is a width of the thermal infrared image, H is a height of the thermal infrared image, R, G, and B respectively represent a red channel value, a green channel value, and a blue channel value, and $RGB_{Nose}$, $RGB_{Mouth}$, and $RGB_{Eyes}$ respectively represent color values of the nose, the mouth, and the eyes.

13. The system for thermal infrared facial recognition according to claim 12, characterized by further comprising:
a standard face determination unit, configured to obtain a standard thermal infrared facial image through superposing and averaging pixels of a plurality of thermal infrared frontal facial images of a plurality of people, wherein a connecting line of the centroid of the left eye region and the centroid of the right eye region of the standard face is parallel to an X-axis of the image plane rectangular coordinate system, and a connecting line of a centroid of the nose region and a centroid of the mouth region of the standard face is parallel to a Y-axis of the image plane rectangular coordinate system;

the region group construction unit, further configured to input a thermal infrared image of the standard face into the trained three-sense component extractor to obtain a key region group of the standard face, comprising coordinates of the centroid of the mouth region, coordinates of the centroid of the left eye region, and coordinates of the centroid of the right eye region; and the image alignment unit, configured to determine coordinates of the key region group of the standard face through following formulae:

$$\overline{X}_{std,p} = \frac{1}{Q}\sum_{s=1}^{Q} X_{s,p}, \ p \in (\text{Mouth}, \text{Leye}, \text{Reye});$$

$$\overline{Y}_{std,p} = \frac{1}{Q}\sum_{s=1}^{Q} Y_{s,p}, \ p \in (\text{Mouth}, \text{Leye}, \text{Reye});$$

where, $\overline{X}_{std,p}$ and $\overline{Y}_{std,p}$ are respectively a width coordinate and a height coordinate of a centroid in a p region of the standard face, p regions are respectively a mouth Mouth region, a left eye Leye region, and a right eye Reye region, $X_{s,p}$ represents a width coordinate of the centroid in the p region of an $s^{th}$ frontal facial thermal infrared image, $Y_{s,p}$ represents a height coordinate of the centroid in the p region of the $s^{th}$ thermal infrared frontal facial image, and Q represents a total number of thermal infrared frontal facial images; determine an affine transformation matrix through a following formula:

$$\begin{bmatrix} X_{std,p} \\ Y_{std,p} \\ 1 \end{bmatrix} = \begin{bmatrix} a & b & c \\ d & e & f \\ 0 & 0 & 1 \end{bmatrix} \begin{bmatrix} x_p \\ y_p \\ 1 \end{bmatrix};$$

where, $(x_p, y_p)$ is respectively a width coordinate and a height coordinate of the centroid in the p region of the thermal infrared facial image to be recognized before face alignment, $$\begin{bmatrix} a & b & c \\ d & e & f \\ 0 & 0 & 1 \end{bmatrix}$$

is the affine transformation matrix, and a, b, c, d, e, and f are all parameters in the affine transformation matrix; and perform affine transformation on the thermal infrared facial image to be recognized according to the obtained affine transformation matrix to obtain the thermal infrared image after face alignment calibration.

14. The system for thermal infrared facial recognition according to claim 11, characterized in that the feature extraction unit is configured to construct a neural network for facial feature recognition to form a corresponding facial feature extraction, wherein the facial feature extraction enables a degree of similarity of features of thermal infrared facial images of a same person to be high and a degree of similarity of features of thermal infrared facial images of different people to be low; a loss function L of the facial feature extraction may adopt two types below: a first loss function is: $L=\|\text{feature}-\text{HoC}\|_2-\|\text{feature}-\text{HeC}\|_2$; where, feature is a feature of an input thermal infrared image extracted through the facial feature extraction, HoC is a category center feature of a category of the input thermal infrared image, and HeC is a category average feature of a certain category in which the input thermal infrared image is divided into; and for a wrongly classified thermal infrared image, a distance between the feature extracted from the thermal infrared image and a category center thereof is decreased while a distance between the feature and a wrongly classified category center is increased; and a second loss function is: $L=\|\text{feature}-\text{HoC}\|_2$; where, feature is the feature of the input thermal infrared image extracted by the facial feature extraction, and HoC is a feature vector of a category center of the input thermal infrared image; and for the wrongly classified thermal infrared image, only the distance between the feature extracted from the thermal infrared image and the category center thereof is decreased.

15. The system for thermal infrared facial recognition according to claim 12, characterized in that the feature extraction unit is configured to construct a neural network for facial feature recognition to form a corresponding facial feature extraction, wherein the facial feature extraction enables a degree of similarity of features of thermal infrared facial images of a same person to be high and a degree of similarity of features of thermal infrared facial images of different people to be low; a loss function L of the facial feature extraction may adopt two types below: a first loss function is: $L=\|\text{feature}-\text{HoC}\|_2-\|\text{feature}-\text{HeC}\|_2$; where, feature is a feature of an input thermal infrared image extracted through the facial feature extraction, HoC is a category center feature of a category of the input thermal infrared image, and HeC is a category average feature of a certain category in which the input thermal infrared image is divided into; and for a wrongly classified thermal infrared image, a distance between the feature extracted from the thermal infrared image and a category center thereof is decreased while a distance between the feature and a wrongly classified category center is increased; and a second loss function is: $L=\|\text{feature}-\text{HoC}\|_2$; where, feature is the feature of the input thermal infrared image extracted by the facial feature extraction, and HoC is a feature vector of a category center of the input thermal infrared image; and for the wrongly classified thermal infrared image, only the distance between the feature extracted from the thermal infrared image and the category center thereof is decreased.

16. The system for thermal infrared facial recognition according to claim 13, characterized in that the feature extraction unit is configured to construct a neural network for facial feature recognition to form a corresponding facial feature extraction, wherein the facial feature extraction enables a degree of similarity of features of thermal infrared facial images of a same person to be high and a degree of similarity of features of thermal infrared facial images of different people to be low; a loss function L of the facial feature extraction may adopt two types below: a first loss function is: $L=\|\text{feature}-\text{HoC}\|_2-\|\text{feature}-\text{HeC}\|_2$; where, feature is a feature of an input thermal infrared image extracted through the facial feature extraction, HoC is a category center feature of a category of the input thermal infrared image, and HeC is a category average feature of a certain category in which the input thermal infrared image is divided into; and for a wrongly classified thermal infrared image, a distance between the feature extracted from the thermal infrared image and a category center thereof is decreased while a distance between the feature and a wrongly classified category center is increased; and a second loss function is: $L=\|\text{feature}-\text{HoC}\|_2$; where, feature is the feature of the input thermal infrared image extracted by the facial feature extraction, and HoC is a feature vector of a category center of the input thermal infrared image; and for the wrongly classified thermal infrared image, only the distance between the feature extracted from the thermal infrared image and the category center thereof is decreased.

* * * * *